Oct. 21, 1952  B. JORGENSEN  2,614,275
LASTING MACHINE
Filed March 9, 1949  11 Sheets-Sheet 2

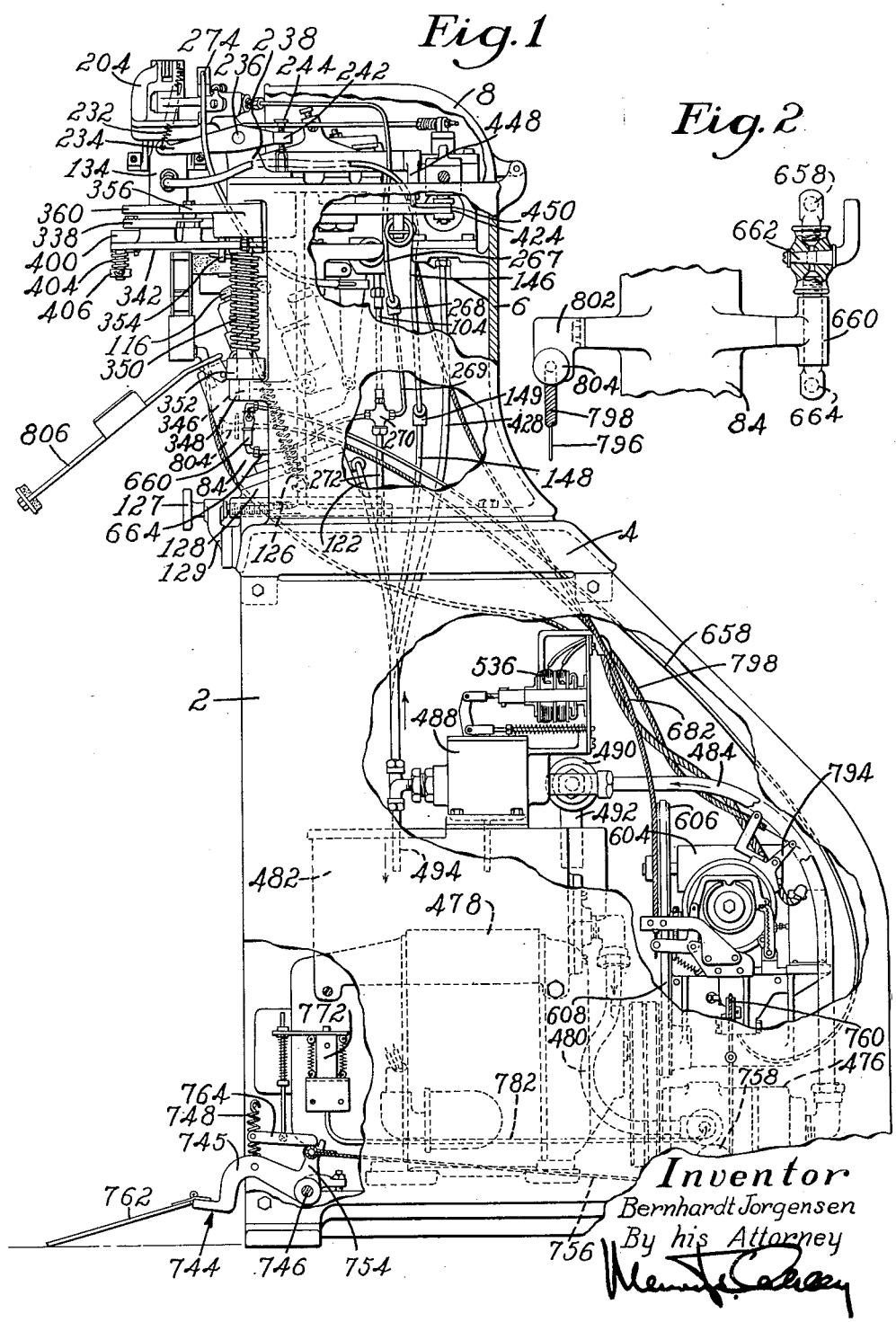

*Inventor*
Bernhardt Jorgensen
By his Attorney

Oct. 21, 1952  B. JORGENSEN  2,614,275
LASTING MACHINE
Filed March 9, 1949  11 Sheets-Sheet 3

Inventor
Bernhardt Jorgensen
By his Attorney

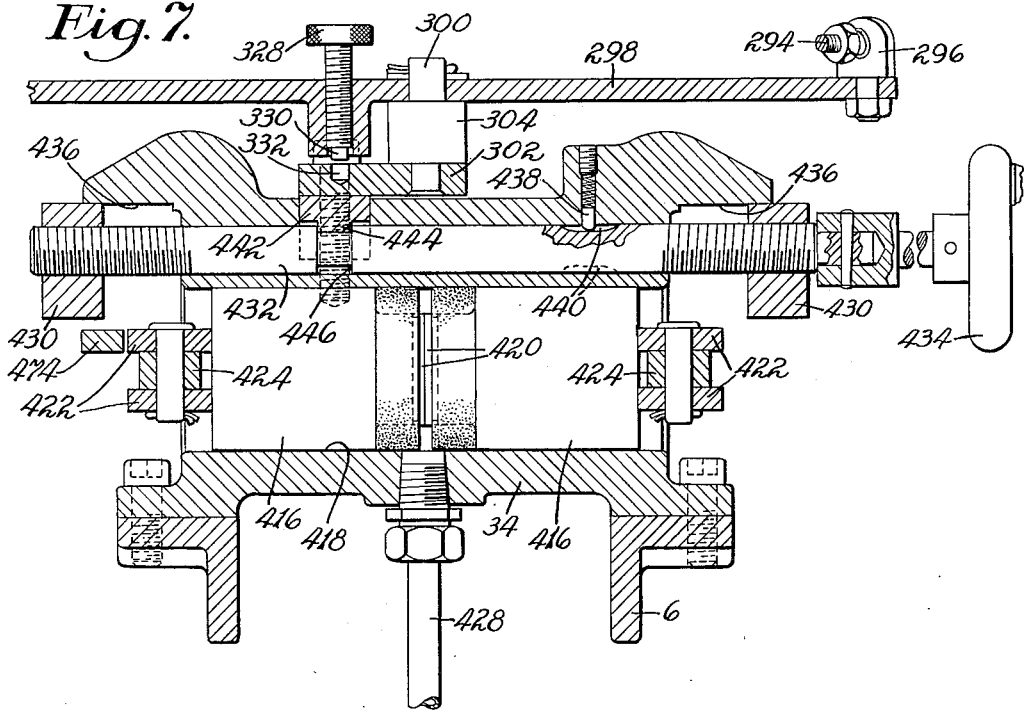
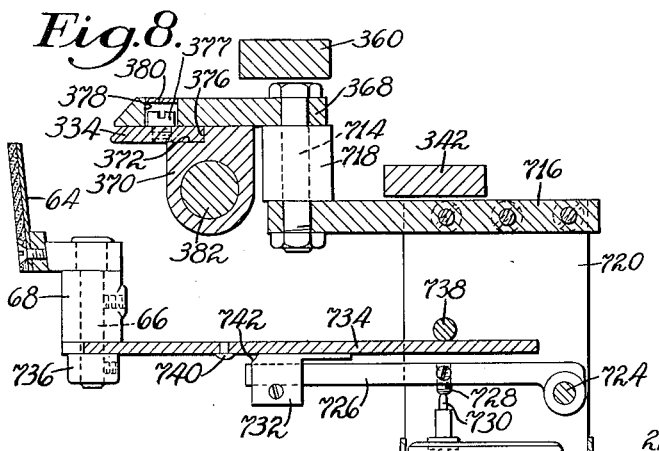
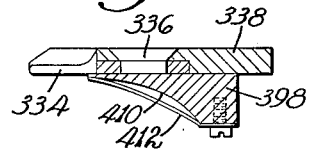
Inventor
Bernhardt Jorgensen
By his Attorney

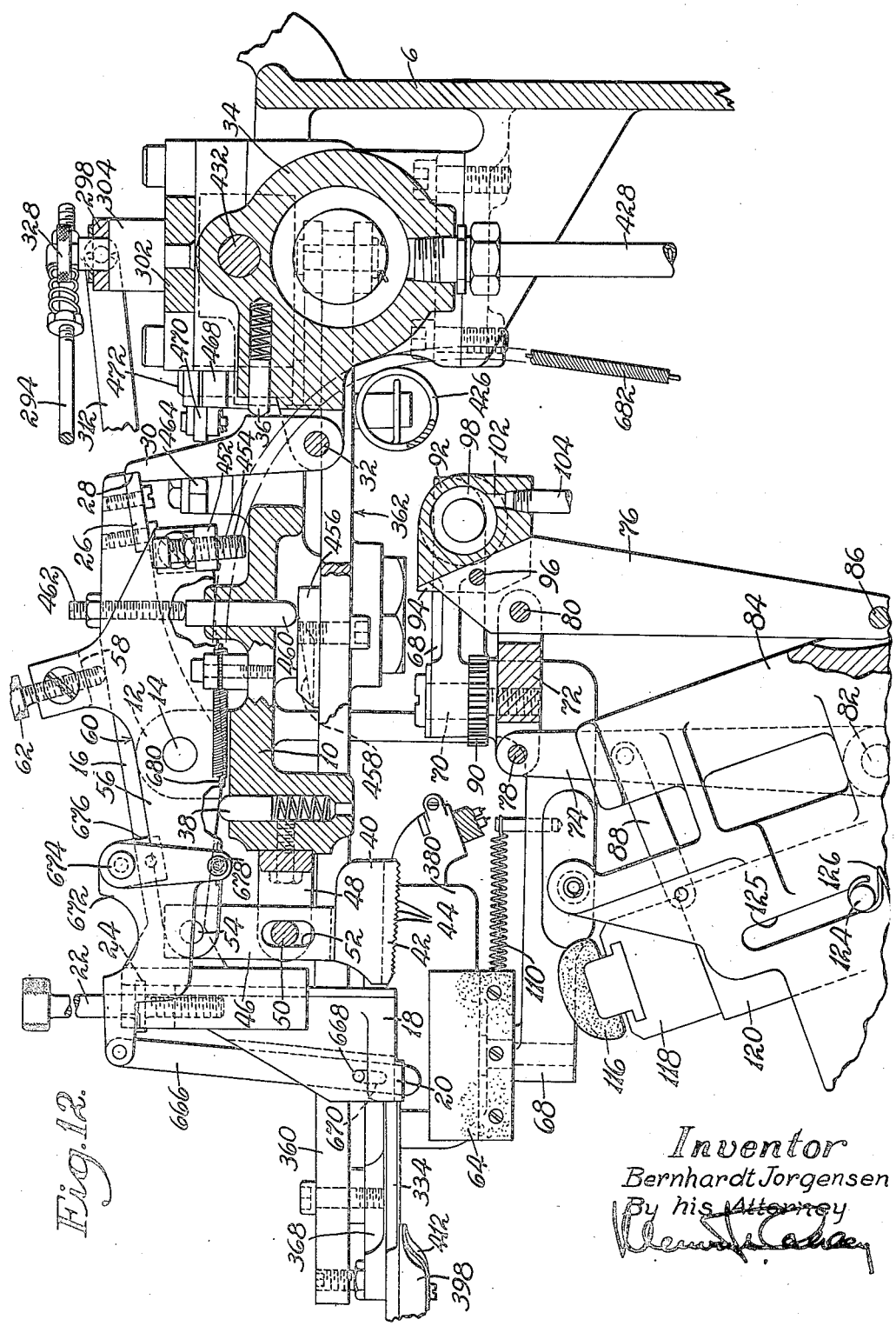

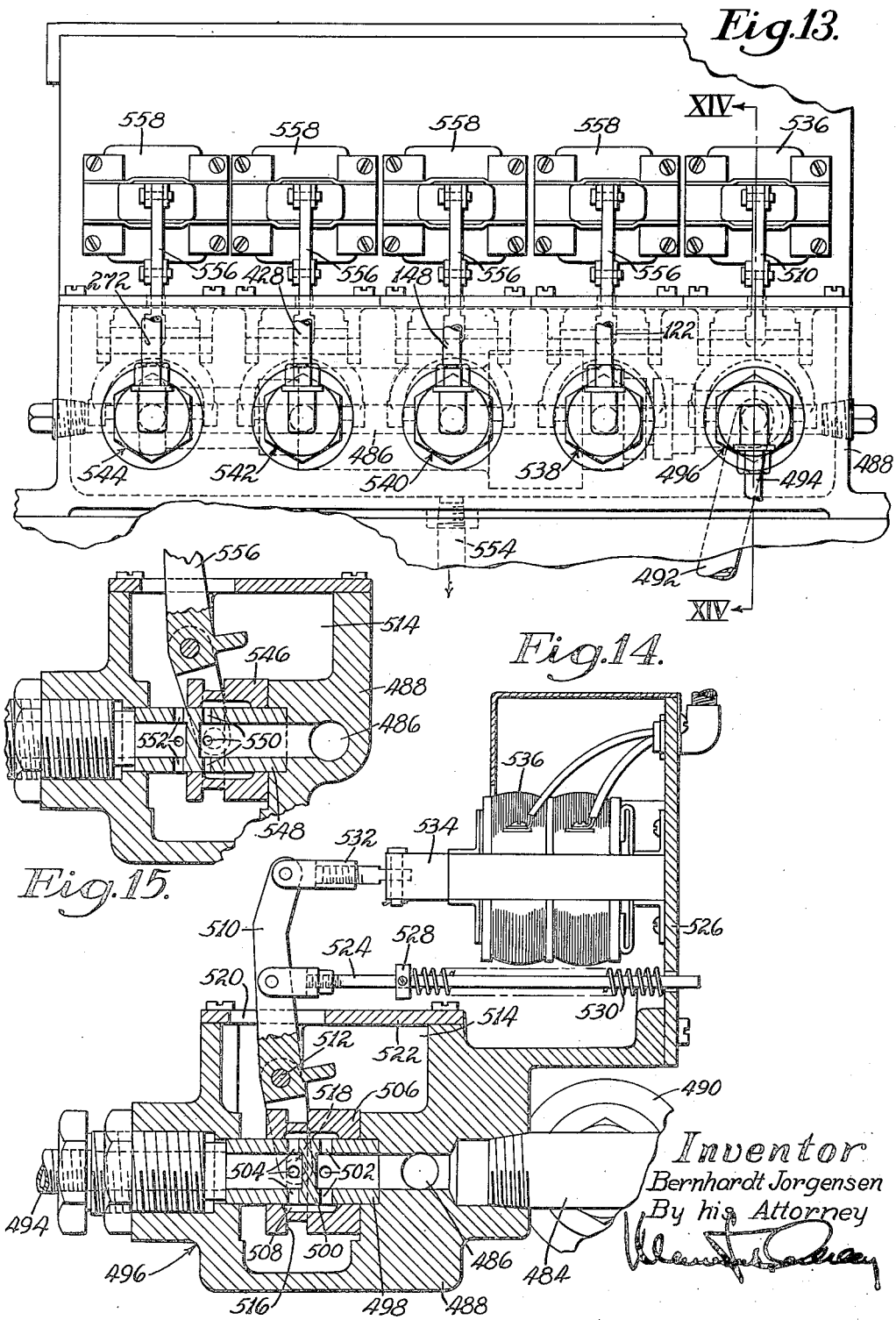

Oct. 21, 1952  B. JORGENSEN  2,614,275
LASTING MACHINE
Filed March 9, 1949  11 Sheets-Sheet 7

Inventor
Bernhardt Jorgensen
By his Attorney

Oct. 21, 1952 B. JORGENSEN 2,614,275
LASTING MACHINE
Filed March 9, 1949 11 Sheets-Sheet 8
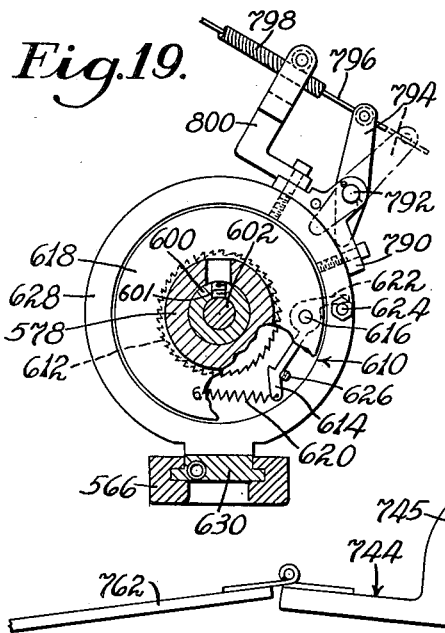
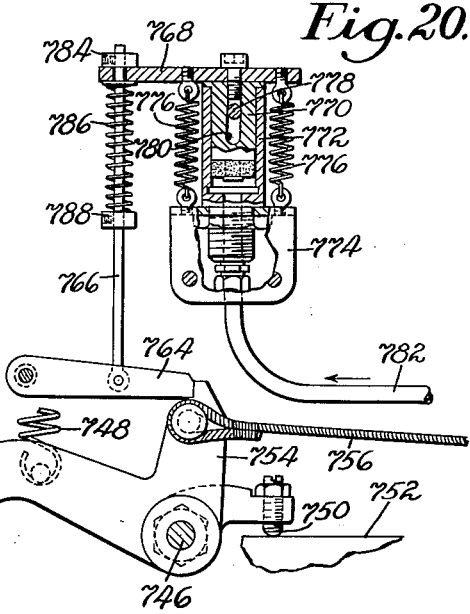
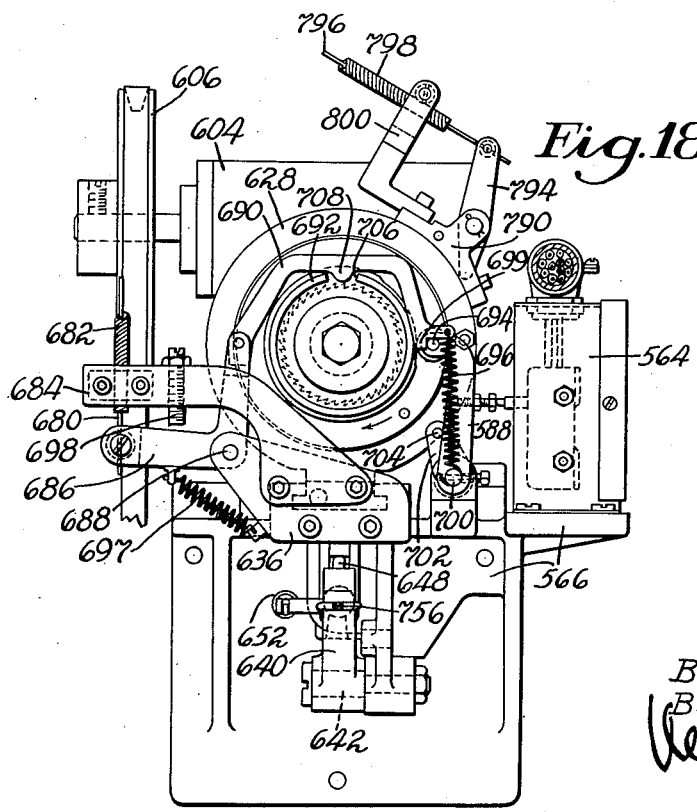
Inventor
Bernhardt Jorgensen
By his Attorney Oct. 21, 1952        B. JORGENSEN        2,614,275
LASTING MACHINE
Filed March 9, 1949        11 Sheets-Sheet 9
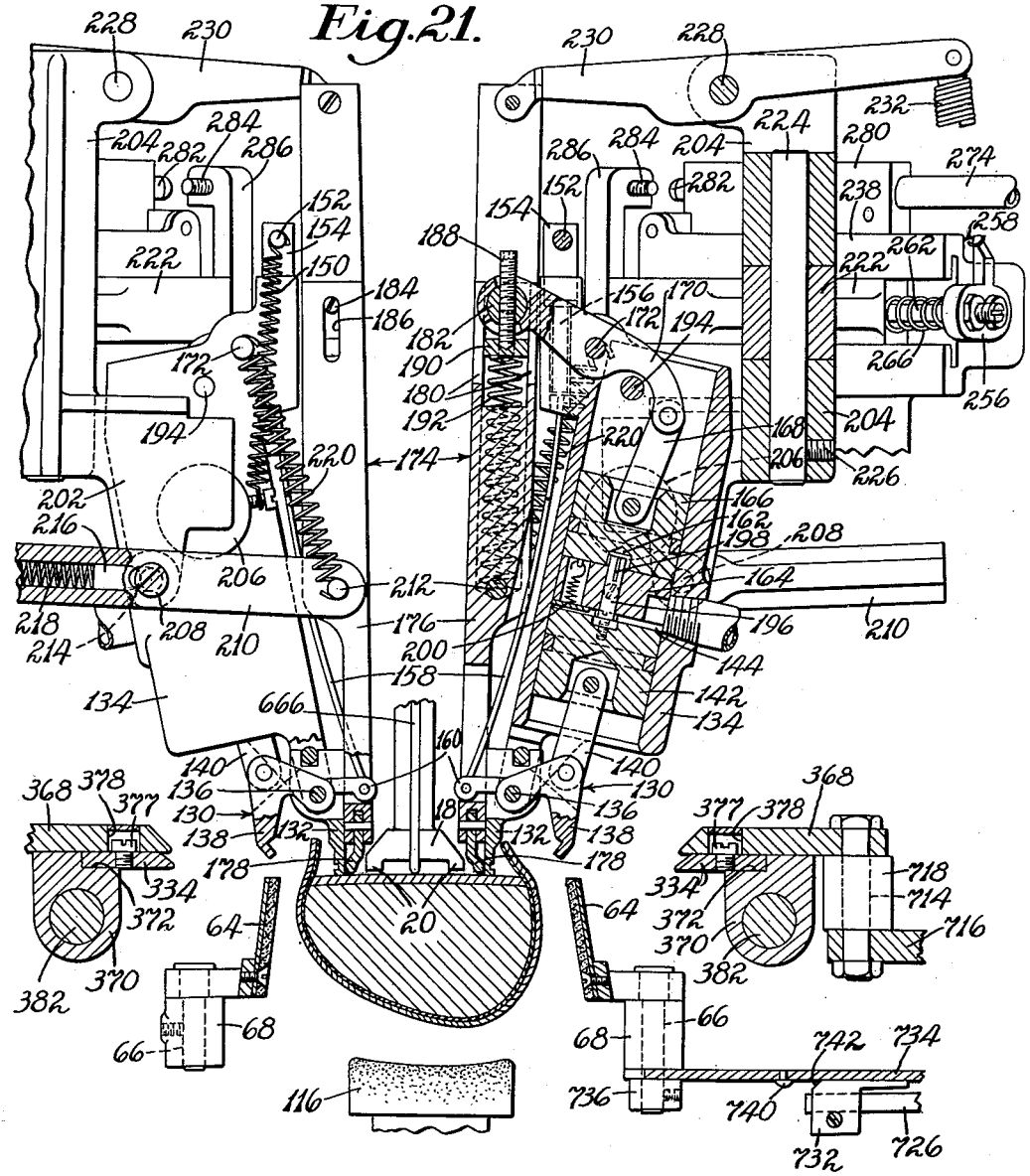
*Fig. 21.*
Inventor
Bernhardt Jorgensen
By his Attorney

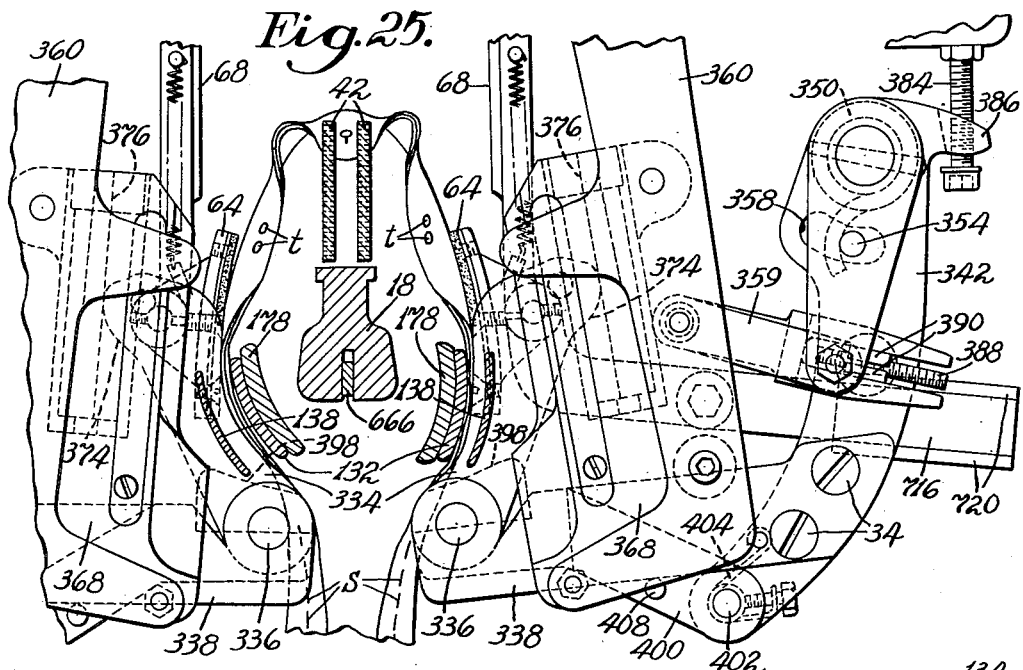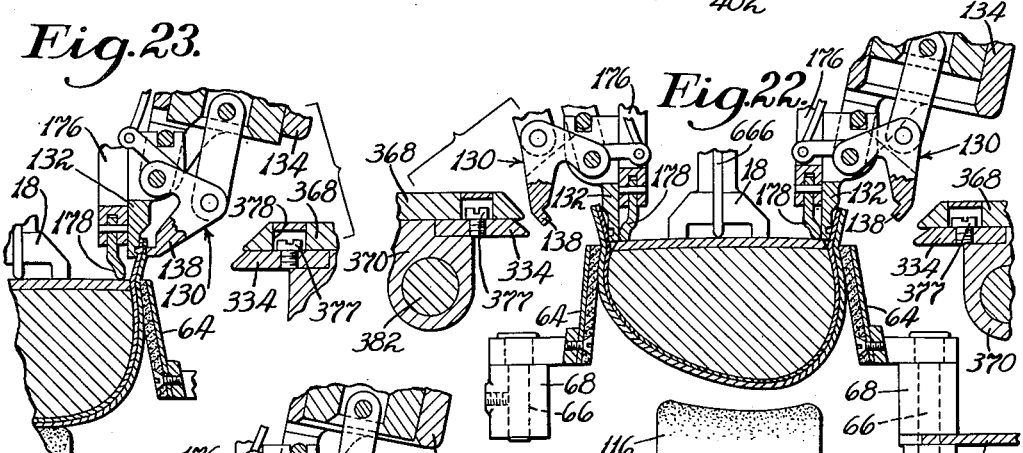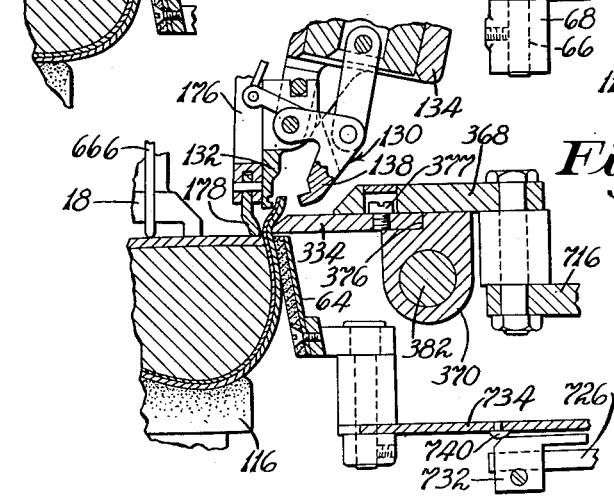

Oct. 21, 1952  B. JORGENSEN  2,614,275
LASTING MACHINE
Filed March 9, 1949  11 Sheets-Sheet 11

*Inventor*
Bernhardt Jorgensen
By his Attorney

Patented Oct. 21, 1952

2,614,275

UNITED STATES PATENT OFFICE 2,614,275

LASTING MACHINE

Bernhardt Jorgensen, Marblehead, Mass., assignor to United Shoe Machinery Corporation, Flemington, N. J., a corporation of New Jersey Application March 9, 1949, Serial No. 80,435

90 Claims. (Cl. 12—10.1)

This invention relates primarily to lasting machines, i. e., to machines for conforming uppers to the contours of their lasts and for securing them in such conformed relation to the lasts. The invention is herein shown as embodied in a machine for lasting the opposite sides of the ball portions of shoes from the toe portions to the shank portions, the machine having grippers for gripping and pulling the upper respectively at the opposite sides of the last and wipers for thereafter wiping the margin of the upper inwardly over an insole on the last into position to be secured to the insole by cement. It is to be understood, however, that in some aspects the invention is not limited to means for operating on that particular portion of a shoe. In some respects the machine herein shown is similar to a machine provided for the same purpose in accordance with the disclosure of United States Letters Patent No. 2,423,454, granted on July 8, 1947, on an application of mine, and in some aspects, therefore, the present invention may be regarded as providing improvements in that earlier machine.

In a machine having means for pulling an upper to conform it to a last and means for thereafter laying or wiping the margin of the upper inwardly over the bottom of the last it is important that the release of the upper by the upper-pulling means be properly timed relatively to the movement of the overlaying or wiping means in order to avoid any loss of the tension applied to the upper before its margin is wiped inwardly and secured. An important feature of the invention accordingly resides in novel means for properly timing the release of the upper by the upper-pulling means. In the machine herein shown the shoe is positioned laterally by side clamp members which are moved equal distances toward each other to engage the sides of the shoe and to centralize the shoe between them and which therefore assume positions in accordance with the width of the shoe, and means is provided for causing the grippers to release the upper at a time determined by the positions of these clamp members. More particularly, the grippers are closed and operated by electrically controlled fluid-pressure means, and their release of the upper results from the opening of a circuit-breaking switch at a time determined by the clamp members, one of two cooperating switch-controlling members being positioned widthwise of the shoe by one of the clamp members and the other switch-controlling member moving inwardly with the wiper at the same side of the shoe.

As in the machine shown in the above-mentioned Letters Patent, the grippers are so positioned initially that their inner jaws are located substantial distances inwardly from the edge of the insole to facilitate insertion of the margin of the upper between their jaws when the shoe is presented to the machine, and before they grip the upper they are moved outwardly away from each other widthwise of the shoe to positions in which their inner jaws are adjacent to the edge of the insole. The invention further provides novel means for limiting such outward movements of the grippers, so that they will always be in proper relation to the edge of the insole when they grip the upper regardless of the width of the shoe. In the construction shown the outward movements of the grippers are thus limited by stop members the limiting positions of which are determined by the above-mentioned shoe-engaging clamp members. For thus controlling the stop members there are provided two series of balls leading therefrom and controlled by levers which carry the clamp members.

In a further aspect, the invention provides novel means for starting the power operation of the machine in response to the presentation of the shoe thereto. Regardless of the size of the shoe the operator, in presenting it to the machine, positions it lengthwise as determined by sight with reference to the side grippers, and to start the machine he thereafter moves the shoe heightwise, i. e., in an upward direction in the use of the machine herein shown. Insurance is thus afforded that the machine will not be started too soon, before the operator has properly positioned it lengthwise. For thus starting the machine there is provided a member arranged to extend initially toward the bottom of the shoe beyond a shoe rest which determines the position of the shoe heightwise in the lasting operation, this member being operated by movement of the shoe toward the shoe rest. In the construction herein shown the operation of this member by the shoe closes an electrical switch controlling a valve which thereupon is moved into position to obstruct a normal circulation of operating fluid delivered by a pump and thus to cause the development of fluid pressure for operating the machine. The same operation of the member by the shoe closes another switch controlling a valve which admits the operating fluid to means for actuating a clutch, the actuation of this clutch initiating a cycle of operations of the machine which corresponds to one revolution of a bank of cams controlling, through electrical means, the operation by fluid pressure of the above-mentioned grippers and other instrumentalities included in the machine.

In the machine herein shown the above-mentioned valve which admits the operating fluid to the clutch-actuating means also serves to admit the fluid to means for moving the grippers outwardly widthwise of the shoe and to means for moving the side clamp members inwardly to position the shoe as hereinabove described. Such movements of the grippers and of the clamp members are therefore effected in response to the presentation of the shoe to the machine, but independently of the cycle of operations resulting from the actuation of the clutch, the shoe being free to shift laterally and thus to be positioned by the clamp members since it is not yet clamped against the above-mentioned shoe rest by a toe rest which is operated early in the cycle. Various novel features of the invention are to be recognized in this general organization. Under some conditions it may be desired to observe the relation of the grippers to the shoe after they have been moved outwardly and the clamp members have positioned the shoe. There is accordingly further provided a shut-off valve which may be moved into position to prevent the delivery of fluid to the clutch-actuating means without preventing its delivery to the means for imparting the outward movements to the grippers and the inward movements to the clamp members. When this shut-off valve is thus in use the operator, after observing as desired the relation of the grippers to the shoe, actuates the clutch by depression of a treadle. In one aspect, therefore, the invention provides means for starting the cycle of operations either in response to presentation of the shoe or independently of the shoe.

For wiping the marginal portion of the upper inwardly at the opposite sides of the ball portion of the shoe the invention further provides a novel organization of wipers and operating means therefor. To insure that the margin of the upper all along the ball portion of the shoe, including especially the portions thereof located near the beginning of the shank portion of the shoe, will be wiped inwardly in the most direct manner without the presence of objectionable wrinkles, the wipers herein shown, which are curved to extend inwardly widthwise of the shoe heelwardly of the ball line, are first moved bodily inward widthwise of the shoe with substantial components of movement lengthwise of the shoe toward its toe end to begin the wiping operation, and are thereafter swung about axes located at the portions thereof which are farthest from the toe end of the shoe to complete the wiping operation. More particularly, in the construction shown, arms mounted for swinging movements about axes extending heightwise of the shoe support carry portions of the wipers which are farthest from the toe end of the shoe, and other arms which swing about other similar axes have means for slidingly engaging and guiding portions of the wipers located nearest the toe end of the shoe, all the arms cooperating to impart the above-described bodily movements to the wipers and said other arms thereafter, by continued movements after the first-named arms have come to a stop, swinging the wipers inward relatively to the first-named arms. To insure that portions of the margin of the upper in locations where the bottom of the ball portion of the shoe is inclined toward the shank heelwardly of the ball line will be properly wiped in and pressed on the insole, the machine is further provided with supplemental wipers which in the construction shown are wedge-shaped, these wipers partaking of the bodily movements of the first-mentioned wipers, which may be termed the main wipers, and being forced yieldingly inward between the bottom of the shoe and the portions of the main wipers which are farthest from the toe end of the shoe.

When the wipers have substantially completed their inward wiping movements the shoe rest which engages the bottom of the forepart of the shoe is released to permit the shoe to be forced more firmly against the wipers by the toe rest engaging the top of the forepart of the shoe. To afford further insurance that the wipers will apply adequate pressure to the portions of the overwiped margin of the upper located near the beginning of the shank portion of the shoe, the shoe rest comprises two members, one arranged to engage the bottom of the toe end of the shoe and the other the bottom of the ball portion of the shoe. Both these members are released as above described when the wipers have substantially completed their wiping movements, but the member engaging the toe end of the shoe is restricted thereafter to a shorter movement in response to the pressure of the shoe thereon than the member engaging the ball portion of the shoe. The tendency of the toe rest, engaging the top of the forepart of the shoe, therefore is to rock the shoe in the direction further to increase the pressure of the wipers on the portions of the margin of the upper located comparatively remote from the toe end of the shoe near the beginning of its shank portion.

Reference has been made above to the fact that when actuation of the clutch to start the cycle of operations in response to the presentation of the shoe to the machine is prevented, a treadle is used thus to actuate or trip the clutch. In the construction herein shown there is further provided clutch-controlling means which may, if desired, be set to cause the machine to come to a stop at the time in the cycle when the wipers are in pressure-applying relation to the margin of the upper, and under those conditions the same treadle is used to cause the machine to complete the cycle. In order to prevent accidental or unauthorized actuation of the clutch at a time when there is no shoe in the machine, there is provided means for rendering the treadle inoperative to actuate the clutch when the machine is idle. In the construction shown depression of the treadle is prevented by a latch which is withdrawn from operative position to release the treadle by fluid-pressure means in response to the development of fluid-pressure prior to the operation of the machine on each shoe. Since the development of fluid pressure results, as hereinbefore described, from the presentation of the shoe to the machine, the release of the treadle also is in response to the presentation of the shoe.

The above and other features of the invention, including novel means for adjusting the grippers for right and left shoes and various novel details of construction and combinations of parts, will now be more particularly described with reference to the accompanying drawings and thereafter pointed out in the claims.

In the drawings,

Fig. 1 is a view in right-hand side elevation of the machine in which the invention is herein shown as embodied, with parts broken away;

Fig. 2 is a view partly in front elevation and partly in section of a portion of the structure shown in Fig. 1;

Fig. 7 is a section on the line VII—VII of Fig. 3.

Fig. 8 is a section on the line VIII—VIII of Fig. 6;

Fig. 9 is a section on the line IX—IX of Fig. 6;

Fig. 10 is a section on the line X—X of Fig. 6;

Fig. 11 is a section on the line XI—XI of Fig. 4;

Fig. 12 is a view partly in right-hand side elevation and partly in section of the upper portion of the machine;

Fig. 13 is a view in front elevation of the valve-operating mechanism and of parts associated therewith;

Fig. 14 is mainly a section on the line XIV—XIV of Fig. 13, showing one of the valves and its operating mechanism;

Fig. 15 is a view similar to a portion of Fig. 14 of one of several other valves used in the machine;

Fig. 18 is a view of the same controlling mechanism in right-hand side elevation;

Fig. 19 is a section on the line XIX—XIX of Fig. 17, with parts broken away;

Fig. 20 is a view partly in right-hand side elevation and partly in section, showing the treadle and the means for locking and releasing it;

Fig. 21 is a view partly in front elevation and partly in section, showing the grippers and other parts as they appear immediately after the presentation of the shoe to the machine but before the parts have started to operate;

Fig. 22 is a view similar to a portion of Fig. 21, showing the parts as they appear at the time in the cycle when the grippers are about to grip the upper;

Fig. 23 is a vertical sectional view showing the right-hand gripper and other parts with the gripper pulling the upper;

Fig. 24 is a view similar to Fig. 23 with the parts as they appear at the time when the grippers release the upper;

Fig. 25 is mainly a plan view of the wipers and their operating mechanism with the parts in the same relation to the shoe as in Fig. 24;

Figure 3:
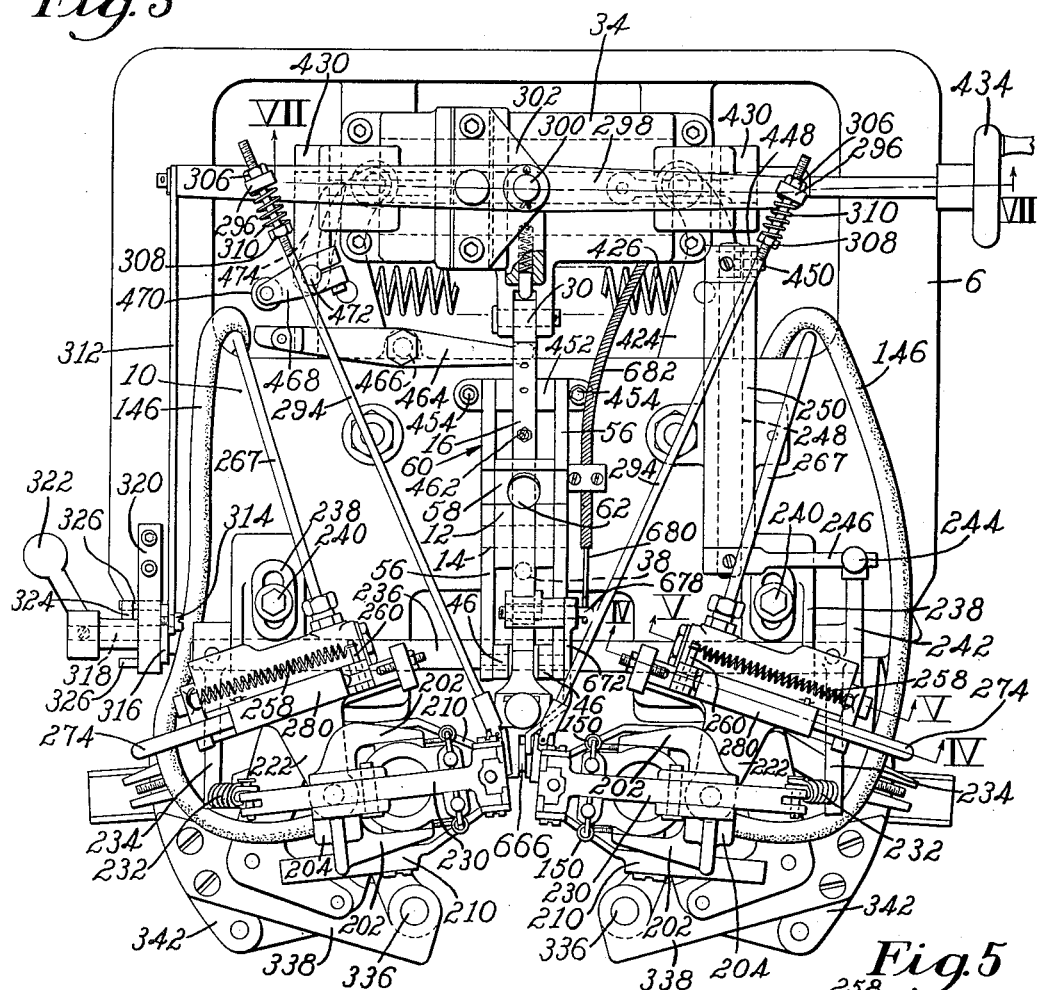
Fig. 3 is a plan view on an enlarged scale of the upper portion of the machine.

The machine has a frame which includes a lower portion 2 (Fig. 1), an intermediate portion 4 and an upper portion 6 on which is pivotally mounted a cover 8 extending normally over portions of the mechanisms at the top of the machine but arranged to be swung upwardly and rearwardly to expose these mechanisms when desired. The portion 6 of the frame includes a horizontal top plate 10 (Fig. 3) provided with a pair of upwardly extending lugs 12 having mounted therein a pin 14 (Fig. 12) on which is pivotally mounted, between the lugs, a forwardly and rearwardly extending lever 16. Mounted for adjusting movement upwardly or downwardly in a guideway formed in the front end portion of this lever is a shoe-rest member 18 the lower end of which is provided with two presser feet 20 spaced apart widthwise of the shoe as shown in Fig. 21 and arranged to engage the ball portion of the shoe. For adjusting the member 18 in directions heightwise of the shoe relatively to the lever 16 there is provided a screw 22 which is threaded in this member and extends upwardly through a bearing in the lever, the screw having thereon a flange 24 extending into a recess in the lever to hold the screw against heightwise movement. Secured on the rear end of the lever is a wear plate 26 arranged to lie normally in a notch 28 formed in the upper end of a latch 30 which is pivotally mounted at its lower end on a pin 32 supported in lugs on a casting 34 secured to the upper portion 6 of the frame. A spring-pressed pin 36 in the casting 34 bears on the latch and tends to swing it in a forward direction, thereby holding it initially against the rear edge of the wear plate 26 as shown in Fig. 12. Forwardly of the pin 14 the lever 16 is engaged underneath by a spring-pressed pin 38 which tends to swing it in a clockwise direction with reference to Fig. 12 and thereby holds the wear plate 26 down in the notch 28. Accordingly, the shoe rest member 18 is held positively by the latch 30 against upward movement and determines the height at which the ball portion of the shoe is positioned for the lasting operation. Since the pressure feet 20 on the member 18 are spaced a substantial distance apart, as shown in Fig. 21, they serve also to determine the position of the shoe with respect to lateral tipping movement.

In addition to the shoe-rest member 18 there is provided another shoe-rest member 40 arranged to engage the bottom of the toe end of the shoe and provided with a pair of presser feet 42 (Fig. 25) arranged to extend lengthwise of the shoe and spaced a short distance from each other widthwise of the shoe, these presser feet having teeth 44 (Fig. 12) thereon for engaging the bottom of the shoe to assist in holding it against displacement in the lasting operation. The member 40 has a pair of upwardly extending arms 46 guided for upward and downward movements between forwardly extending arms of a U-shaped bracket 48 secured to the plate 10 and further guided by a pin 50 in this bracket extending through slots 52 in the arms 46. At their upper ends the arms 46 are pivotally connected by a pair of pins 54 to the front ends of a pair of forwardly and rearwardly extending arms 56 which are pivotally mounted between their front and rear ends on the same pin 14 as the lever 16, the arms 56 being positioned at the outer sides of the lugs 12 and being rigidly connected together by a block 58 mounted between upwardly extending portions thereof and to which they are secured. The two arms 56 thus constitute a second lever 60 supporting the shoe rest member 40. A screw 62 threaded in the block 58 is arranged to bear on the top of the lever 16 rearwardly of the pin 14 and thereby to determine adjustably the height of the member 40 relatively to the member 18, thus determining the position of the shoe with respect to lengthwise tipping movement. Initially the screw 62 may or may not be in contact with the lever 16, since the lever 60 may swing a short distance relatively to the lever 16 between limits determined by the screw 62 and by the pin 50 in the slots 52. If the screw 62 is not initially in contact with the lever 16 it will be moved into contact with it by upward pressure of the shoe against the member 40.

After the shoe has been presented to the machine by the operator and while it is free to move laterally, it is automatically positioned widthwise in proper relation to the lasting instrumentalities by engagement of a pair of clamp members 64 with the opposite sides of its ball portion in locations adjacent to the edge of the insole and opposite the edge of the last bottom, as illustrated in Fig. 22. These clamp members are pivotally mounted on vertical studs 66 secured in the front ends of rearwardly extending levers 68. The rear portions of these levers are upwardly offset relatively to the front portions and are pivotally mounted on vertical studs 70 which are threaded at their lower ends in a crossbar 72 (Figs. 6 and 12), the crossbar being supported on the upper end portions of a pair of substantially vertical links 74 spaced apart widthwise of the shoe and a third link 76 located farther rearwardly than the links 74. The crossbar is connected by studs 78 to the links 74 and by a stud 80 to the link 76. At their lower ends the links 74 are connected by studs 82 to a casting 84 supported on the intermediate portion 4 of the frame, and the lower end of the link 76 also is connected to this casting by a stud 86. A link 88 further connects one of the links 74 to the casting 84 to prevent any swinging movement of the links 74 and 76 relatively to the casting and thus to hold the crossbar 72 in fixed relation to the casting. Formed on the levers 68 are gear sectors 90 which extend inwardly over the crossbar 72 and are in mesh with each other, so that the front arms of the levers will swing equal distances toward or from each other about the studs 70. Supported on the upper end of the link 76 is a cylinder 92 provided with a slot 94 into which the link extends, the cylinder being secured in fixed relation to the link by a pin 96. Mounted in this cylinder are two pistons 98 the outer rounded ends of which are arranged to engage the rear ends of the levers 68. Bosses 100 of reduced diameter are formed on the inner ends of the pistons to provide an annular space for the admission of operating fluid when the pistons are in their innermost positions. Through a port 102 in the cylinder in communication with this annular space operating fluid is admitted at the proper time from a pipe 104 leading to a source of fluid supply, as more particularly hereinafter described. It will be understood that by outward movements of the pistons 98 the levers 68 are operated to move the clamp members 64 equal distances toward each other to engage and centralize the shoe between them. Such movements of the levers are effected against the resistance of a spring 106 which is mounted in the casting 84 and is in engagement at its opposite ends with plungers 108 bearing against the inner faces of the front arms of the levers. Accordingly, when the fluid is released from the cylinder 92 the levers are returned to their initial positions by the spring 106, the limits of their return movements being determined by engagement of the opposite ends of the pin 96 with the rear end portions of the levers. Tension springs 110 connected to pins 112 on the levers and to screws 114 threaded in the clamp members 64 substantially determine the positions of the clamp members initially with respect to movements about the studs 66 but permit them to turn and thus to adjust themselves to the shoe upon engagement therewith.

After the shoe has been positioned laterally by the clamp members 64 as above described it is clamped against the shoe-rest members 18 and 40 by a member 116 arranged to engage the shoe underneath on the top of the forepart. This member is hereinafter referred to as a toe rest, but it engages also portions of the forepart located farther heelwardly than the toe. This toe rest is supported on a piston 118 (Fig. 12) mounted for upward movement in a forwardly inclined direction in a cylinder 120 which is formed as a part of the casting 84. Such upward movement of the piston is effected at the proper time by operating fluid admitted to the lower end of the cylinder from a pipe 122 (Fig. 1). In case there is no shoe in the machine when the piston is thus operated, its upward movement is limited by a pin 124 extending through the piston into slots 125, only one of which is shown, in the opposite sides of the cylinder. Springs 126, only one of which is shown, connected to the opposite ends of this pin serve to return the piston when fluid is released from the cylinder. The casting 84, and therefore the toe rest and the side clamps and their operating means as a unit, are adjustable lengthwise of the shoe by a screw 127 threaded in a block 128 which supports the casting and mounted to turn in a lug 129 on the front of the portion 4 of the frame.

For pulling the upper the machine is provided with a pair of grippers 130 (Fig. 21) arranged to grip the margin of the upper respectively at the opposite sides of the ball portion of the shoe in locations between portions of the upper previously fastened to the insole by side pulling-over tacks t (Fig. 25) and by staples s used in lasting the shank portion of the shoe. These grippers and their operating means are in many respects similar to the disclosure of the previously mentioned Letters Patent. Each gripper includes an inner jaw 132 arranged to engage the inner face of the margin of the upper materials and secured to the lower end of a cylinder 134 supported as hereinafter described. Pivotally mounted on a pin 136 for swinging movements toward and from the jaw 132 is an outer jaw 138 connected by a link 140 to a piston 142 which is moved downwardly by operating fluid admitted to a chamber 144 above the piston to cause the jaws to grip the upper. The fluid is thus admitted to the chambers 144 in the two cylinders 134 through flexible tubes 146 (Fig. 3) in communication with a pipe 148 (Fig. 1) through an outlet member 149. The swinging of the jaw 138 of each gripper to grip the upper is effected, in the construction herein shown, against the resistance of two return springs 150 (see Fig. 3) connected at their lower ends to the cylinder 134 and at their upper ends to the opposite ends respectively of a rod 152 (Fig. 21) extending transversely through the enlarged heads 154 of two downwardly extending pins 156. These pins are vertically movable in bores formed in the upper portion of the cylinder casting 134, and at their lower ends they are engaged by the two branches of a forked upper end portion of a rod 158 pivotally connected at its lower end to an arm 160 integral with the jaw 138. Initially the enlarged heads 154 of the pins 156 rest on the top of the cylinder casting 134, and when the jaw 138 is swung inwardly by the piston 142 the upward movement of the rod 158 moves the pins 156 upwardly against the resistance of the springs 150.

The pulling of the upper by each gripper is effected by moving the gripper and the cylinder 134 in an upward direction. For this purpose the cylinder is provided with a second fluid-receiving chamber 162 separated from the chamber 144 by a partition 164 in the cylinder. Movable in the chamber 162 is a piston 166 connected by a link 168 to one end of a lever 170 pivotally mounted substantially midway between its opposite ends on a pin 172 on the upper end of the cylinder 134. When the piston is moved upwardly by the fluid it acts through the lever 170 to impart upward movement to the cylinder 134 and the gripper by a purchase on the bottom of the shoe through a holddown 174. This holddown includes a bar 176 having pivotally mounted on its lower end for tipping movement about an axis extending widthwise of the shoe an insole-engaging presser foot 178. One end of the lever 170 extends into slots 180 in the bar 176 and is provided with a bearing for a transverse pin 182 in the opposite ends of which are threaded two studs 184, only one of which is shown, guided for downward and upward movements in slots 186 in the bar. Threaded in the pin 182 is a screw 188 which extends through slots in the end of the lever 170 and bears at its lower end on a crossbar 190 in engagement with the upper ends of two springs 192 in the bar 176, as in the construction shown in the previously mentioned Letters Patent. Accordingly, in the pulling of the upper, the lever 170 acts yieldingly on the bar 176 through the springs 192 which are compressed more or less in response to resistance of the upper to the force of the pull applied thereto by the gripper. A pin 194 in the cylinder 134 is arranged to engage the piston 166 to limit upward movement of the piston if the machine is operated in the absence of a shoe.

In order properly to time the movement of each piston 166 relatively to the movement of the jaw-closing piston 142, the operating fluid is admitted to the chamber 162 from the chamber 144 when the piston 142 has substantially completed its upper-gripping movement. For this purpose the partition 164 in the cylinder 134 has extending through it a bore in which is slidingly mounted a rod-like valve member 196 secured to the piston 142. This valve member has in one side thereof near its upper end a slot 198 through which fluid is permitted to flow from the chamber 144 to the chamber 162 when the piston 142 has nearly completed its movement. When the fluid is released from the chamber 144 after the pulling of the upper to cause the gripper to release the upper, the fluid in the chamber 162 returns to the chamber 144 through a passage in the partition 164 controlled by a check valve 200 and then passes from the chamber 144 into the flexible tube 146.

Each gripper-supporting cylinder 134, in the construction herein shown, is guided in its upward and downward movements by two arms 202 (see Fig. 3) formed on the lower end of a casting 204 and arranged to engage flat faces formed on bosses 206 (Fig. 21) on opposite sides of the cylinder. Pivotally mounted on studs 208 on these arms are links 210 located respectively at the opposite sides of the cylinder and pivotally connected to a pin 212 in the holddown bar 176. These links, therefore, normally determine the position of the lower end of the holddown bar relatively to the casting 204 with respect to movement widthwise of the shoe. Each link, however, has therein a short slot 214 through which the stud 208 extends, to permit a limited relative movement of the holddown bar and the casting widthwise of the shoe. The stud is engaged by a pin 216 slidingly mounted in an extension of the link 210, the pin being engaged on its outer end by a compression spring 218 which thus tends to move the link in an outward direction and holds it normally in the position shown in Fig. 21 with the stud 208 at the inner end of the slot 214. Springs 220 connected respectively to the opposite ends of the pin 212 and to the previously mentioned pin 172 in the upper end of the cylinder 134 assist the force of gravity in moving the cylinder downwardly after the release of the upper by the gripper and also tend to swing the cylinder and the lever 170 as a unit in an inward direction relatively to the holddown 174 about the axis of the pin 182. Normally the jaw 132 of the gripper is thus held against the outer face of the lower end of the holddown bar and in the pulling of the upper slides upwardly along this face. It will be evident that through the lever 170 the gripper and the cylinder 134 are supported on the pin 182 in the holddown.

Each casting 204 is mounted on an arm 222 (Figs. 3 and 21) supported as hereinafter described and extending into a recess in the casting, a pin 224 being mounted in bores in the arm and in portions of the casting located above and below the arm. This pin is secured at its lower end to the casting by a setscrew 226. Pivotally mounted on a pin 228 supported in a forked upper end of the casting 204 is a lever 230 one arm of which is pivotally connected to a bifurcated upper end portion of the holddown bar 176. Connected to the other arm of this lever is the upper end of a spring 232 the lower end of which is connected to an arm 234 (Figs. 1 and 3) secured to a shaft 236 mounted to turn in bearings formed in brackets 238 associated respectively with the opposite side grippers, these brackets being secured by screws 240 on the top plate 10 of the frame. That is, there is a separate arm 234 associated with each gripper, both arms being secured to the common rockshaft 236. The arm 234 associated with the right-hand gripper has integral therewith a rearwardly extending arm 242 in which is a screw 244 arranged to bear at its lower end on an arm 246 fast on a rockshaft 248 which is mounted in a bracket 250 on the top plate 10 and is controlled as hereinafter described. Initially the rockshaft 248 holds the arm 246 against downward movement, as will be later described, and each of the springs 232 is fully contracted. Each holddown 174, therefore, is supported at a predetermined height by the lever 230 associated therewith, the spring 232 being strong enough to sustain the weight of the holddown and of the cylinder 134 and other parts supported by the holddown without expansion of the spring. It will further be evident that by turning the screw 244 both holddowns and the grippers supported thereby may be adjusted simultaneously either upwardly or downwardly.

Figure 4:
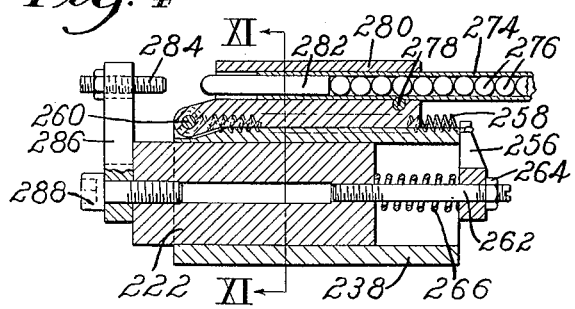
Fig. 4 is a section on the line IV—IV of Fig. 3.
Figure 5:
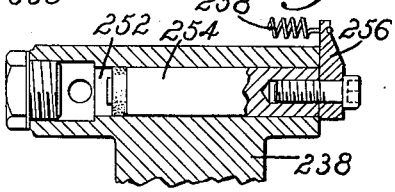
Fig. 5 is a section on the line V—V of Fig. 3.

Each arm 222 is guided in the corresponding bracket 238 for sliding movements in directions widthwise of the shoe, as shown in Figs. 4 and 11. Accordingly, by such movement of each arm the casting 204 supported thereon is moved to carry the corresponding holddown and gripper widthwise of the shoe. Each bracket 238 is formed to provide a cylinder 252 (Fig. 5) in which is a piston 254 having fast on its outer end a block 256 arranged to engage the bracket to limit inward movement of the piston, the piston being held initially in its innermost position by a spring 258 connected to the block and to a pin 260 on the bracket. Extending through the block and threaded in the arm 222 is a rod 262 (Fig. 4) having thereon a nut 264 engaging the outer face of the block. Between the inner face of the block and the arm 222 is a compression spring 266 through which the position of the arm and accordingly the initial positions of the holddown and the gripper are determined. It will be evident that these positions of the holddown and the gripper may be varied by turning the rod 262 by means of a screw driver inserted in a slot in the outer end of the rod. As shown in Fig. 21, the adjustment is such that initially the presser feet 178 of the holddowns and the inner jaws 132 of the grippers are positioned substantial distances inwardly from the opposite side edges of the insole. This facilitates the positioning of the more or less inwardly inclined portions of the margin of the upper materials between the open jaws of the grippers when the shoe is presented to the machine. At the time in the operation of the machine when the clamp members 64 are moved inwardly as hereinbefore described to centralize the shoe between them, the grippers and the holddowns are moved outwardly widthwise of the shoe to positions in which the presser feet 178 of the holddowns are in engagement with the insole adjacent to its outer edge and portions of the inner jaws 132 of the grippers are slightly beyond the edge of the insole, as illustrated in Fig. 22, the inner jaws of the grippers by such movements positioning the margin of the upper more nearly upstanding before it is gripped and, it may be, detaching it from the edge of the insole if it has adhered prematurely thereto. Such outward movements of the grippers and the holddowns are effected by outward movements of the pistons 254 against the resistance of the springs 258 in response to admission of operating fluid to the cylinders 252. The fluid is thus admitted to the cylinders through pipes 267 (Fig. 3) both of which lead from an outlet member 268 (Fig. 1) in communication through a pipe 269 with another outlet member 270 which is also in communication with the previously mentioned pipe 104 leading to the cylinder 92 containing the pistons for operating the clamp members 64. Operating fluid is supplied to this outlet member through a pipe 272 as hereinafter described.

The limits of the above-described outward movements of the grippers and the holddowns are automatically determined in accordance with the width of the shoe by the positions of the clamp members 64 in engagement with the shoe. For this purpose there are provided tubes 274 each having a series of balls 276 therein, one end of each tube being secured by a pin 278 (Fig. 4) in a block 280 supported on the top of the corresponding bracket 238 and held in place on the bracket by the previously mentioned pin 260 which extends through lugs on the bracket and a lug on the block, as shown in Fig. 3. Slidingly mounted in that end of each tube which is in the block 280 is a pin 282 arranged to engage the endmost ball 276 of the series and extending outwardly beyond the block 280 in position to serve as a stop by engagement with a screw 284 mounted in an arm 286 which is secured by a screw 288 to the corresponding movable arm 222. The opposite end of each tube 274 is in a position in front of an arm 290 (Fig. 6) formed integral with the corresponding lever 68 which carries the clamp member 64, and in this end of the tube is slidingly mounted a pin 292 arranged to be engaged by the arm 290. Accordingly, when the clamp members 64 are swung inwardly to engage and position the shoe, the arms 290 determine the positions of the pins 292 and, through the series of balls 276, correspondingly determine the positions of the pins 282 at the other ends of the tubes 274. The pins 282, therefore, determine by engagement with the screws 284 the limits of the outward movements of the grippers and the holddowns and thus insure that the grippers and the holddowns will be located precisely in the desired relation to the opposite side edges of the insole when the grippers are closed on the upper.

The castings 204 which support the grippers and the holddowns in the manner hereinabove described are mounted for swinging movements about the axes of the vertical pins 224, which are farther from the sides of the shoe than the grippers, to adjust the grippers and the holddowns bodily lengthwise of the shoe and to change their angular relation to the sides of the shoe. To control the castings 204 with respect to such swinging movements rods 294 (Fig. 3) are connected respectively by universal joints to the different castings and extend therefrom rearwardly and outwardly widthwise of the machine. At their rear ends these rods extend through members 296 which are mounted for turning movements about vertical axes on outwardly extending arms of a lever 298 pivotally mounted between its opposite ends on a stud 300 extending upwardly from a plate 302 which is secured on the top of the previously mentioned casting 34, this stud being located at equal distances from the axes of the members 296. A spacing collar 304 (Fig. 7) is mounted on the stud between the plate and the lever to support the lever at a distance above the plate. Nuts 306 (Fig. 3) threaded on the rods 294 are arranged to engage the rear faces of the members 296, and between the front faces of these members and other nuts 308 on the rods are compression springs 310. Pivotally connected to the left-hand end of the lever 298 is the rear end of a link 312 the front end of which is pivotally mounted on a stud 314 eccentrically located on a disc 316 formed on a short rockshaft 318, this rockshaft being mounted for turning movements in a bracket 320 fast on the top plate 10. Fast on this rockshaft is a hand lever 322 on the hub of which is a finger 324 arranged to engage one or the other of two pins 326 on the bracket 320, these pins being located at diametrically opposite sides of the rockshaft 318. It will be understood that by swinging the hand lever to the position determined by engagement of the finger 324 with one of the pins the grippers and the holddowns are properly positioned for operating on a right shoe, and that by swinging it to the position determined by the other pin they are properly positioned for operating on a left shoe. That is, the gripper which is to grip and pull the upper at the inner side of either shoe is positioned nearer the toe end of the shoe than the gripper at the outer side and its jaws are positioned at a different angle to the longitudinal median line of the forepart of the shoe than the jaws of the outer side gripper, as required by the shape of the shoe. When the hand lever 322 is in either of the above-mentioned positions, the stud 314 is on dead center, so that the grippers will remain in the positions to which they have been moved. In case it is desired to centralize the grippers with respect to such movements, as in making preliminary adjustments, there is threaded in the lever 298 a screw 328 (Fig. 7) having on its lower end a stud 330 arranged to enter a recess 332 in the plate 302 to maintain the lever 298 in a central position.

Figure 6:
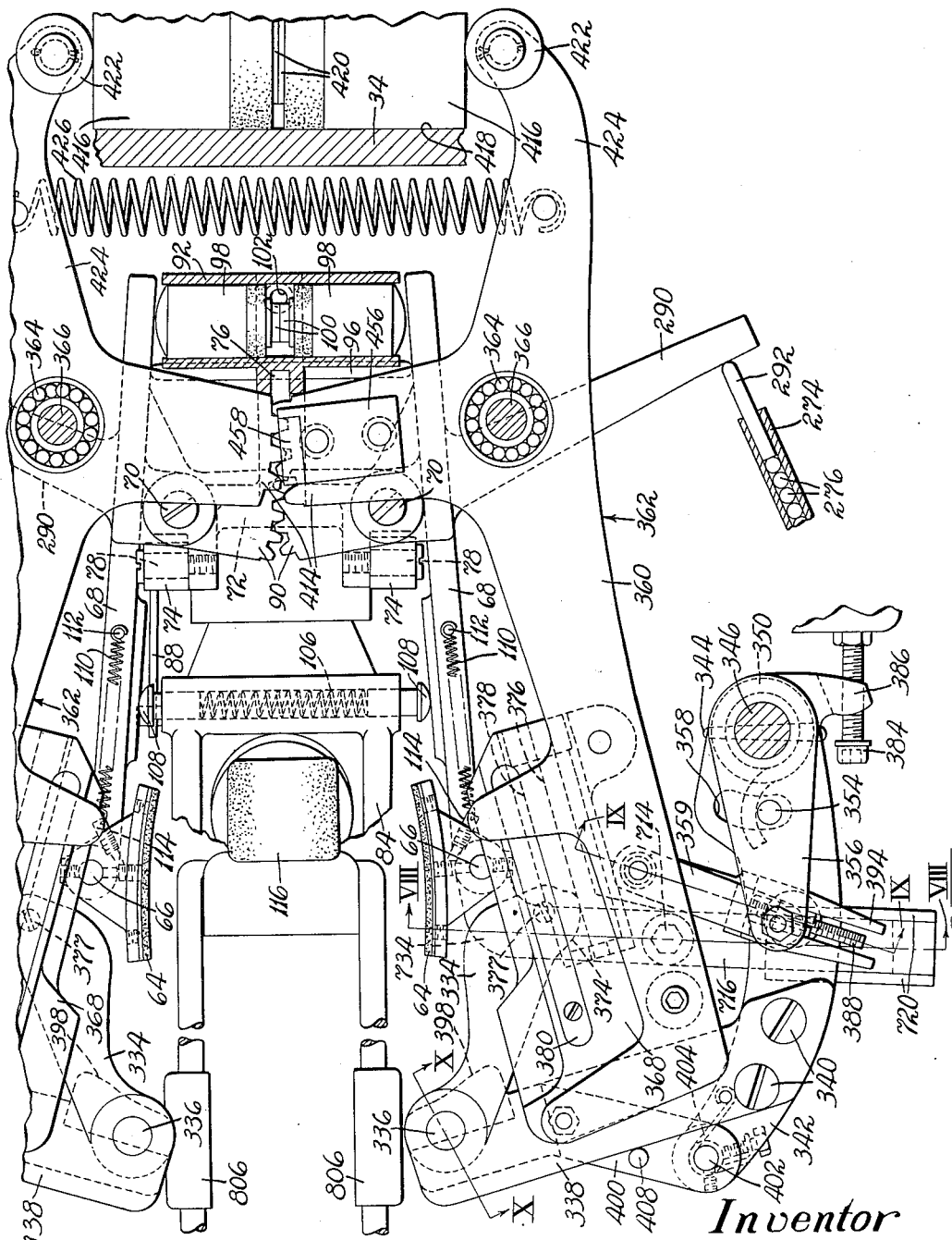
Fig. 6 is mainly an enlarged plan view of the wipers and their operating mechanism and of parts closely associated therewith.

After the upper has been pulled by the grippers its marginal portion is wiped inwardly over the insole at the opposite sides of the ball portion of the shoe by wipers 334 (Fig. 6). Each of these wipers has a wiping edge extending lengthwise of the shoe and curved to extend also inwardly widthwise of the shoe heelwardly of the ball line. Each wiper is pivotally mounted at its front end on a stud 336 (Figs. 6 and 10) carried by the inner end of a bar or plate 338 which is secured at its outer end by screws 340 to an arm 342 located below it and may be regarded as an extension of the arm. The arm 342 is secured by a pin 344 to a vertical rockshaft 346 the lower end of which is pivotally mounted in a lug 348 (Fig. 1) on the portion 6 of the frame and the upper end of which is pivotally mounted in the top plate 10. The shaft 346 is surrounded by a torsion spring 350 the lower end of which is anchored to a collar 352 (Fig. 1) secured to the shaft but adjustable to vary the tension of the spring and the upper end of which is engaged by a pin 354 carried by a comparatively short arm 356 loose on the shaft 346, the pin extending downwardly into a slot 358 in the arm 342. Accordingly the arm 342 is operated by the arm 356 through the spring 350 to impart inward movement toward the shoe to the front end of the wiper 334. The arm 356 is operated through a link 359 by a forwardly extending arm 360 of a lever 362 mounted between its front and rear ends to swing on a ball bearing 364 about a stud 366 extending downwardly from the top plate 10. Secured to the arm 360 underneath in spaced relation thereto is a plate 368 which overlies and engages a portion of the wiper 334. Fast on the lower face of this plate is a block 370 (Fig. 8) provided with a groove 372 into which the rear end of the wiper extends for supporting and guiding it. A curved edge 374 (Fig. 6) on the rear end portion of the wiper is engaged by a straight wall 376 of the groove 372 to move the rear end of the wiper inwardly and to swing it about the stud 336. Threaded in the rear end portion of the wiper is a screw 377 which extends upwardly into a slot 378 in the plate 368 for returning the wiper when the arm 360 swings outwardly. Located in this slot is a cover plate 380 extending over the screw. Mounted in the block 370 is an electrical heating unit 382 for maintaining the wiper in a heated condition.

It will be evident that each of the studs 336 on which the front end of the corresponding wiper 334 is pivotally mounted is swung about the axis of the rockshaft 346 by the inward swinging movement of the arm 342 and, by reason of the relation of the rockshaft to the shoe, has a large component of rearward movement lengthwise of the shoe toward its toe end as it is carried inwardly widthwise of the shoe. The inwardly curved front portion of the edge of the wiper near the stud, therefore, serves by a corresponding movement to wipe the margin of the upper effectively in an inward direction over that portion of the edge of the insole which curves inward heelwardly of the ball line. It will be understood that as this portion of the wiper is being moved inwardly and rearwardly by the arm 342 the simultaneous inward swinging movement of the arm 360 of the lever 362 moves the rear portion of the wiper also inwardly toward the shoe, this portion of the wiper sliding along the straight wall 376 of the groove 372 by reason of the direction of the movement of the arm 342. The wiper, therefore, receives a bodily movement lengthwise of the shoe toward its toe end as well as widthwise of the shoe. This bodily movement of the wiper, however, is adjustably limited prior to the completion of the wiping operation by engagement of the head of a screw 384 (Fig. 6) threaded in the frame with a forked tail portion 386 of the arm 342. Thereafter the arm 360 continues its inward swinging movement and swings the arm 356 idly against the resistance of the spring 350, the pin 354 moving along the slot 358 in the arm 342. Such continued movement of the arm 360 serves to swing the wiper 334 about the stud 336 which is held stationary, thus causing the wiper to complete its inward wiping action on the margin of the upper.

Further to control the arm 342 and to vary its initial position, there is provided a screw 388 (Fig. 9) threaded in the head of a stud 390 which is pivotally mounted on the arm and bearing at its inner end against a shoulder 392 formed on a link 394 which is pivotally mounted on a stud 396 on the arm 360, this being the same stud which connects the link 359 to this arm. The head of the stud 390 lies in a forked portion of the link 394 to maintain the link and the stud in proper relation to each other. It will be understood that the tension of the spring 350 tends to swing the arm 342 in an inward direction and therefore holds the end of the screw 388 against the shoulder 392 and that adjustment of the screw causes the arm 342 to swing inward or outward relatively to the arm 360 with accompanying inward or outward movement of the stud 336 on which the front end of the wiper is pivotally mounted. The head of the stud 390 is split to permit it to be contracted by a screw 397 to secure the screw 388 in adjusted position.

To increase the range, lengthwise of the shoe, of effective wiping action of the wiping means on the margin of the upper and to insure that portions of the margin in locations where the bottom of the inverted shoe slopes downward heelwardly of the ball line will be properly wiped inwardly and secured to the insole by the cement, there is provided under the front end portion of each wiper 334 a supplemental wiper 398 (Figs. 6 and 10), this wiper engaging the wiper 334 in the vicinity of the stud 336 and also engaging portions of the plate 338. The supplemental wiper is part of an arm 400 fast on a stud 402 which is rotatably mounted in the front end of the arm 342. The arm 400 accordingly may swing about the axis of the stud in directions lengthwise of the shoe. A torsion spring 404 coiled about the stud is anchored at one end to the arm 342 and at its other end to a collar 406 (Fig. 1) fast on the stud. This spring tends to swing the arm 400 in a rearward direction and holds it normally in a position determined by engagement of a pin 408 thereon with the front edge of the plate 338. The wiper 398, as shown in Fig. 10, is substantially wedge-shaped and presents toward the portion of the margin of the shoe bottom on which it acts a face 410 which is concave heightwise of the shoe. Secured to this wiper is a resiliently flexible plate 412 extending upwardly along the face 410 in spaced relation thereto to adjust itself to different shoe contours. It will be understood that the action of the supplemental wiper 398 on the shoe results from the swinging movement of the arm 342, this wiper being wedged inwardly between the front end of the wiper 334 and the downwardly inclined margin of the shoe bottom below it. The movement of the wiper 398 lengthwise of the shoe may be stopped by the resistance of the shoe before the arm 342 completes its swinging movement, whereupon the torsion spring 404 yields to permit continued movement of the arm 342, the front edge of the plate 338 moving away from the pin 408.

As above explained, the operative movements of the wipers result from swinging movements of the levers 362 about the studs 366. Formed on these levers are inwardly extending gear sectors 414 which are in mesh with each other to equalize the swinging movements of the two levers. For operating the levers there are provided two pistons 416 mounted in a cylinder 418 which is formed in the previously mentioned casting 34, the pistons having at their inner ends bosses 420 of reduced diameter to provide an annular space for the reception of operating fluid when the pistons are at the limits of their inward movements. At its outer end each piston engages a pair of rolls 422 (Fig. 7) mounted on a rearwardly extending arm 424 of the corresponding lever 362. A spring 426 connected to the arms 424 of both levers serves to retract the wipers after their operation on the shoe and to return the pistons to their innermost positions. Operating fluid is admitted to the cylinder 418 through a pipe 428 leading from the source of supply, as more particularly hereinafter explained. To limit the outward movements of the pistons 416 and thereby to limit the wiper-operating movements of the levers 362 there are provided stop blocks 430 (Fig. 7) arranged to be engaged by the pistons, these blocks being mounted on opposite threaded end portions of a shaft 432 mounted to turn in a bearing in the casting 34. By means of a hand wheel 434 on its right-hand end this shaft may be turned to adjust the blocks 430 equal distances toward or from each other, the blocks being guided and held from turning by engagement with flat faces 436 on the casting 34. The shaft 432 is held in any position of adjustment by a spring-pressed pin 438 mounted in the casting 34 and arranged to enter one or another of a series of recesses 440 in the shaft. To prevent lengthwise movement of the shaft there is mounted in a recess in the casting 34 under the plate 302 a member 442 provided with a tongue 444 extending into an annular recess 446 in the shaft.

As hereinbefore explained, each holddown 174 and the gripper associated therewith are supported initially at a predetermined height by the corresponding lever 230 (Fig. 21) the outer end of which is connected by the fully contracted spring 232 to one of the arms 234 on the rockshaft 236 (Fig. 3), this rockshaft being held from turning by engagement of the screw 244 in the arm 242 with the arm 246 which is fast on the rockshaft 248 held stationary at that time. For thus holding this rockshaft stationary there is fast on its outer end a downwardly extending arm 448 (Figs. 1 and 3) provided on its lower end with a roll 450 in engagement with the outer edge of the rearwardly extending arm 424 of the right-hand wiper-operating lever 362. When this arm 424 is swung outwardly in the operation of the wipers it swings the arm 448 in an upward direction by its engagement with the roll 450 and thereby, through the mechanism described, turns the rock shaft 236 in the direction to tension the springs 232. These springs, therefore, immediately upon release of the upper by the grippers in the manner hereinafter more fully explained, retract the holddowns heightwise of the shoe from the insole to permit the wipers to be moved inwardly under them and also, through the holddowns, prevent the grippers from moving downwardly far enough to interfere with the wipers. It will be understood that when the wiper-operating levers 362 are returned to their starting positions the holddowns and the grippers move downwardly to the positions determined adjustably by the screw 244.

When the wipers have substantially completed their operative movements the latch 30 (Fig. 12) is swung rearwardly, by means presently to be described, to release the lever 16 and thereby to permit the shoe to be forced more firmly up against the wipers by the toe rest 116 which is subject to the force of the operating fluid. It will be understood that such release of the lever 16 permits upward movement of the shoe rest member 18 supported on the lever and engaging the bottom of the ball portion of the shoe, and since the double lever 60 supporting the other shoe rest member 40 engaging the toe end of the shoe is controlled by the lever 16 through the screw 62 in the manner hereinbefore described, the release of the lever 16 also permits upward movement of the member 40. To insure that adequate pressure will be applied by the wipers to portions of the margin of the upper located comparatively remote from the toe end of the shoe near the beginning of its shank portion, the construction is further such as to prevent the member 40 from being moved as far upwardly at this time by pressure of the shoe thereon as the member 18. Accordingly, the tendency of the toe rest is to rock the shoe in the direction to raise its heel end. To limit as desired the upward movement of the member 40 a block 452 is secured to the rear ends of the arms 56 of the lever 60 and has threaded therein a pair of screws 454 arranged to engage the top plate 10 of the frame. By reference to Fig. 12 it will be seen that initially, when the lever 16 is held by the latch 30, there is some space between the ends of the screws 454 and the top plate. The return of the lever 16 into position to be held by the latch 30, and accordingly the return of the lever 60 through the screw 62, are effected by a cam plate 456 (Figs. 6 and 12) fast on one of the gear sectors 414, this cam plate having thereon an inclined face 458 engaged by the lower end of a pin 460 vertically movable in the top plate 10. The upper end of this pin is engaged by a screw 462 in the lever 16. It will be understood that before the latch 30 is swung rearwardly to release the lever 16 the cam plate 456 has been moved far enough to permit the pin 460 to drop and thus to free the lever for swinging movement.

The means for swinging the latch 30 to release the lever 16 includes a lever 464 (Figs. 3 and 12) pivotally mounted substantially midway between its opposite ends on a vertical rod 466 extending upwardly from the top plate 10. One end of this lever is arranged to engage the front face of the latch 30. For swinging the lever to operate the latch there is provided an arm 468 having thereon a roll 470 arranged to engage the other end of the lever, this arm being fast on a vertical rockshaft 472 mounted in the left-hand stop block 430 which limits the outward movement of the left-hand piston 416, the stop block being extended forwardly for this purpose. Also fast on the rockshaft 472 is an arm 474 arranged to be engaged by one of the rolls 422 on the rear end of the left-hand wiper-operating lever 362 (Fig. 7). As shown in Fig. 3, there is provision for sufficient lost motion in the operation of the arm 468 to prevent the latch 30 from being moved to release the lever 16 until the wipers have nearly completed their operative movements. Since the arm 468 is carried by the adjustable stop block 430, the proper time relation between the termination of the wiper movements and the release of the lever 16 is maintained whatever may be the adjustment of the stop block.

The fluid pressure system of the machine, including the means for controlling the flow of the operating fluid, preferably light oil, to and from the different cylinders for operating the parts described, is in many respects similar to the disclosure of Letters Patent No. 2,597,004, granted on May 20, 1952, on an application of mine, and therefor need not be described in complete detail. For generating the fluid pressure there is provided a pump 476 (Fig. 1) driven continuously by an electric motor 478 and receiving fluid through a pipe 480 from an open sump 482 secured to the lower portion 2 of the frame. The pump forces the fluid through a pipe 484 into a manifold 486 (Figs. 13, 14 and 15) comprising a bore formed in a casting 488 supported on the sump 482. When the machine is in operation the fluid is thus maintained under pressure in the manifold 486. To dispose of the excess fluid under those conditions and to limit the maximum pressure of the fluid, there is provided a relief valve (not shown) mounted in a casing 490, the fluid which passes this valve returning to the sump through a pipe 492.

In order to save power when the machine is idle the fluid is permitted at that time to return from the manifold 486 to the sump through a pipe 494 (Figs. 1 and 13) without the development of any substantial pressure in the manifold. For controlling this outlet from the manifold there is provided a valve unit 496 (Figs. 13 and 14) in the casing 488. As shown in Fig. 14, a tube 498 having therein a partition 500 is in communication at one end with the manifold 486 and at the other end with the pipe 494. Extending through the tube at one side of the partition are ports 502 and at the other side of the partition ports 504. A sleeve valve 506 slidingly mounted on the tube has therein an annular recess 508 which, when the valve in its initial position as shown in Fig. 14, affords communication between the ports 502 and 504 and thus permits the fluid to escape freely from the manifold. The valve is connected to the lower end of a lever 510 pivotally mounted at 512 in a chamber 514 in the casting 488, the lower end of the lever being forked and provided with pins lying in a groove 516 in the valve, one of these pins being shown by a dotted line at 518. The lever 510 extends upwardly through a slot 520 formed in a cover plate 522 over the chamber 514, and pivotally connected to the lever above the cover plate is a rod 524 extending rearwardly through an opening in a plate 526 fast on the casting 488. Surrounding this rod between the plate and a collar 528 on the rod is a spring 530 by which the valve 506 is held in its initial position. At its upper end the lever 510 is connected by a link 532 to the core 534 of a solenoid 536 secured on the plate 526. It will be understood that when the electrical circuit of the solenoid is closed the valve 506 is moved from its initial position against the resistance of the spring 530. By such movement of the valve a portion thereof is carried into position to cover the ports 502, so that the fluid can no longer escape past the valve. This causes the pressure to build up in the manifold under control of the relief valve in the casing 490. The means for thus closing the circuit of the solenoid will be hereinafter described.

For controlling the flow of fluid to and from the cylinders hereinbefore described there are mounted in the casting 488 a plurality of other valve units 538, 540, 542 and 544. The valve unit 538 controls the flow of fluid to and from the pipe 122 leading to the toe rest cylinder 120, and the valve unit 540 controls the flow to and from the pipe 148 communicating with the tubes 146 which lead to the grippers. Similarly, the valve unit 542 controls the flow of fluid to and from the pipe 428 leading to the cylinder 418 in which are the pistons for operating the wipers, and the valve unit 544 controls the flow to and from the pipe 272 leading to the outlet member 270 which is in communication with the means for moving the grippers and the holddowns outwardly over the insole and the means for moving the clamp members 64 into engagement with the shoe. Each of these several valve units includes a valve, one of which is shown at 546 in Fig. 15, this valve being operated in the same manner as the valve 506 shown in Fig. 14, but being so constructed and arranged that in its initial position it prevents any flow of fluid from the manifold 486. That is, the valve is slidingly mounted on a tube 548 similar to the tube 498 of Fig. 14, but initially prevents any flow of fluid from ports 550 in the tube to other ports 552 therein, the last-named ports being open to the chamber 514, which is common to all the valve units, to permit exhaust of fluid from the particular pipe with which the valve unit communicates. The exhaust fluid which flows into the chamber 514 returns to the sump through a pipe 554 (Fig. 13). Each of the valves 546 is operated in the same manner as the previously mentioned valve 506 through a lever 556, corresponding to the lever 510, by a solenoid 558 in response to the closing of the electrical circuit of the solenoid.

Figure 16:
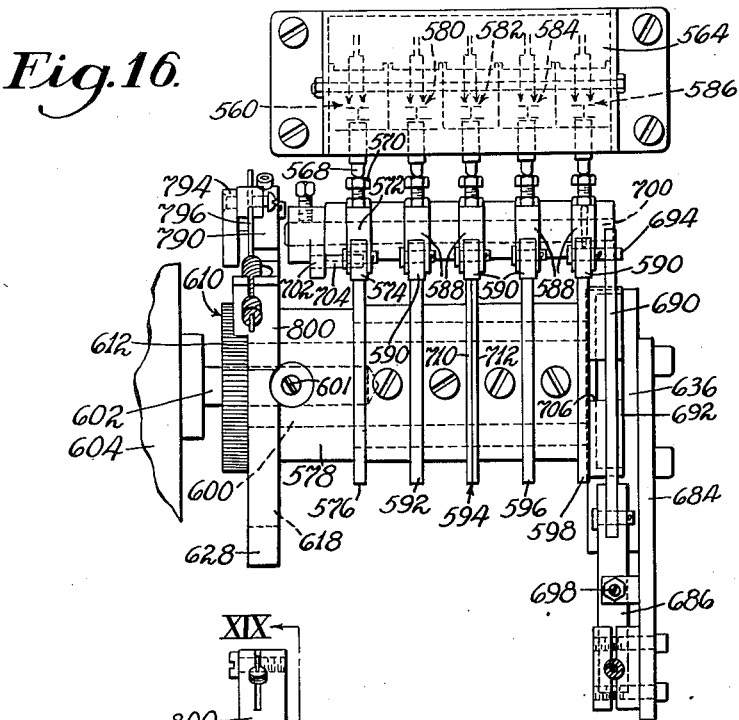
Fig. 16 is a plan view of the means for controlling the electrical operation of the valves.

Associated with the solenoid 536 by which the valve 506 is operated is an electrical switch 560 shown diagrammatically in Fig. 16 for closing and opening the electrical circuit of the solenoid, the switch being mounted in a switch box which is confined in a casing 564 supported by a bracket 566 on the portion 2 of the frame. A pin 568 is movable inwardly to close the switch and is reversely movable by a spring (not shown) to open the switch. The pin 568 is engaged and moved inwardly by the head of a screw 570 carried by a downwardly extending arm 572 which is pivotally mounted at its lower end and is provided on its upper end with a roll 574 arranged to be engaged by a cam 576 fast on a drum 578. There are also other switches 580, 582, 584 and 586 associated with the different solenoids 558 which operate the valves 546 of the valve units 538, 540, 542 and 544 respectively, these switches being operated by swinging arms 588 similar to the arm 572 and provided with rolls 590 arranged to be engaged respectively by cams 592, 594, 596 and 598 fast on the drum 578. The drum, as more fully disclosed in the previously mentioned Letters Patent No. 2,597,004, is mounted on a sleeve 600 which is secured by a setscrew 601 to a shaft 602 rotatable in bearings in a casing 604 on the bracket 566 and continuously rotated through gearing (not shown) in this casing by a pulley 606 (Fig. 1) driven through a belt 608 by the motor 478. The drum 578 is rotated intermittently by the shaft 602 through a clutch 610. This clutch includes a ratchet wheel 612 fast on the sleeve 600 and a pawl 614 (Fig. 19) pivotally mounted on a stud 616 carried by a flange 618 on the drum 578. A spring 620 connected to the pawl and to the flange tends to swing the pawl into engagement with the ratchet wheel to cause the drum to be driven by the shaft 602. Initially, however, a tail 622 on the pawl is engaged by a stop 624 to hold the pawl out of engagement with the ratchet wheel and in engagement with a pin 626 on the flange 618. The stop 624 is secured to a ring 628 which encircles the flange 618 and which is integral below the flange with a slide 630 movable in directions lengthwise of the drum 578 along a guideway in the bracket 566. To actuate or trip the clutch to start a cycle of operations of the machine the slide 630 is moved toward the right with reference to Fig. 17 to withdraw the stop 624 from engagement with the tail 622 of the pawl and thus to permit the pawl to be swung by the spring 620 into engagement with the ratchet wheel 612. The slide is thus movable against the resistance of a spring 632 which is mounted therein and presses against a pin 634 in engagement with a plate 636 fast on the bracket 566. This spring normally holds the slide against a stop member 638 fast on the bracket. For operating the slide to trip the clutch there is provided an arm 640 pivotally mounted on a stud 642 on the bracket 566, the arm having pivotally mounted on its upper end a pawl 644 arranged to engage a downwardly extending portion of an angular member 646 adjustably secured to the slide 630. A spring pressed pin 648 in the arm 640 holds the pawl normally with a tail portion 650 thereof in engagement with a face on the arm. A spring 652 connected to the arm and to the bracket 566 holds the arm initially against a stop face on the bracket. When the arm is swung toward the right with reference to Fig. 17 it acts through the pawl 644 to move the slide 630 and the ring 628 in the same direction to trip the clutch and thus to cause the drum 578 to begin to rotate, the arm being swung far enough to carry the pawl past the downwardly extending portion of the member 646 and thus to release the slide 630 to cause it to be immediately returned by the spring 632. This movement of the arm is limited by a stop pin 653. It will be understood that upon return movement of the arm 640 the pawl slips past the member 646, the pin 648 being depressed against the resistance of its controlling spring.

For swinging the arm 640 to trip the clutch as above described there is provided a piston 654 movable in a cylinder 656 formed in the bracket 566 with its outer end in engagement with the arm. Operating fluid is admitted to the cylinder 656 from a pipe 658 leading to the upper end of a valve casing 660 (Figs. 1 and 2) secured to the casting 84, this valve casing having therein a rotary valve 662 which may be assumed to be in an open position to permit communication through a passage in the casing between the pipe 658 and a pipe 664 leading to the previously mentioned outlet member 270. As previously explained, fluid is supplied to this outlet member through a pipe 272 leading from the valve unit 544 (Fig. 13), the valve 546 of this unit being operated to admit fluid to the pipe 272 in response to the closing of the switch 586 (Fig. 16). This switch, and also the switch 560 which causes the valve 506 (Fig. 14) to be operated to close the outlet from the manifold and thus to cause the development of fluid pressure in the manifold, are closed directly in response to the presentation of the shoe to the machine. For this purpose a bar 666 (Figs. 3 and 12) is mounted for upward and downward movements in a slot in the shoe rest member 18, the bar being guided by a pin 668 mounted in this member and extending through a slot 670 in the bar. The lower end of the bar extends downwardly below the member 18 to permit it to be engaged by the bottom of the ball portion of the shoe when the operator presents the shoe to the machine, the bar being lifted by upward movement of the shoe toward the member 18 after the operator has determined that the shoe is properly positioned lengthwise relatively to the grippers. At its upper end the bar 666 is pivotally connected to the front end of a lever 672 which is pivotally mounted on a pin 674 supported in a block 676 fast on the lever 16. Connected to a pin 678 in the lever 672 is one end of a flexible wire cable 680 mounted in a guide 682 which leads rearwardly and downwardly to a bracket 684 (Fig. 18) fast on the previously mentioned plate 636. Below this bracket the cable 680 is connected to one arm of a bell-crank lever 686 pivotally mounted on a pin 688 on the plate 636, the other arm of this bell-crank lever being pivotally connected to one arm of a yoke-shaped member 690 partially embracing an outwardly extending flange 692 on the cam 598. The other arm of this yoke member rests on a pin 694 and is initially held down on the pin by a spring 696, this pin being mounted in the upper end of that arm 588 which controls the switch 586 and serving to support the roll 590 on the arm. In response to the lifting of the bar 666 by the shoe the cable 680 applies a pull to one arm of the bell-crank lever 686 against the resistance of a return spring 697 connected to the lever and thereby causes this lever to move the yoke member 690 toward the right with reference to Fig. 18, the movement of the lever being limited by a stop screw 698 on the bracket 684. As the yoke member is thus moved a finger 699 extending downwardly therefrom acts on the pin 694 to swing the arm 588 in the direction to close the switch 586. This arm 588 is pinned at its lower end to a shaft 700 mounted for rocking movements in bearings in the bracket 566, so that the shaft is turned by the movement of the arm, and fast on the opposite end of the shaft from this arm is an arm 702 (Fig. 16) having therein a pin 704 arranged to engage the arm 572 which controls the switch 560 and to swing that arm simultaneously with the above-mentioned arm 588, the other arms 588 being loosely mounted on the shaft 700. Accordingly the switch 560 and the switch 586 are both closed by the upward movement of the shoe, thus causing the development of fluid pressure in the manifold and the delivery of the fluid under pressure to the outlet member 270 (Fig. 1) and to the pipes 104, 269 and 664 leading from this outlet member. Directly in response to the presentation of the shoe, therefore, the fluid is admitted to the cylinders 252 for moving the grippers and the holddowns outwardly widthwise of the shoe, to the cylinder 92 for moving the clamp members 64 inwardly into engagement with the shoe and to the cylinder 656 for operating the arm 640 to trip the clutch and thus to start the cycle of operations of the machine, the cycle of operations corresponding to one complete revolution of the drum 578.

By reference to Figs. 16 and 18 it will be seen that the outwardly extending flange 692 on the cam 598 has therein a recess 706 into which initially extends a curved projection 708 on the yoke member 690. This recess is of sufficient extent to permit such rearward movement of the yoke member as to close the switches 560 and 586 in the manner above described while the projection 708 is still in the recess. Immediately upon the starting of the drum 578, however, one edge of the flange 692 acts on this projection to swing the yoke member upwardly about its connection with the bell-crank lever 686 and thus to move the yoke member out of position to control the pin 694. By this time the arm 572 is under control of the cam 576 and that arm 588 which controls the switch 586 is under control of the cam 598. These cams have depressions (not shown) therein to cause the switches 560 and 586 to open substantially at the end of the cycle. At the end of the cycle the recess 706 in the flange 692 arrives in a position under the projection 708, thus permitting the yoke 690 to swing downward and to assume its initial relation to the pin 694. The projection 708 has the further function of insuring, by engagement with the flange 692 in the recess 706, that the drum 578 will stop in the correct position. It will be further understood that the other cams 592, 594 and 596 on the drum control the switches 580, 582 and 584 in proper time relation to one another to cause the fluid-operated mechanisms controlled by these switches to operate in the proper order. The cam 594 which controls the flow of fluid to the grippers comprises two plates 710 and 712 which may be relatively adjusted about the axis of the drum to vary the time when the grippers grip the upper, the construction permitting such adjustment not being herein shown in detail.

Instead of utilizing the cam 594 to determine the time when the fluid is released from the gripper cylinders 134 to cause the grippers to release the upper, mechanism controlled by the clamp members 64 is provided for this purpose. Secured by a bolt 714 (Figs. 6 and 8) to that plate 368 which is associated with the right-hand wiper 334 is a bar 716, the bar being spaced below the plate by a collar 718 so that it is located below the arm 342. Secured to the opposite sides of this bar are two downwardly extending plates 720 between which is mounted an electrical switch 722 in the same circuit as the switch 582 controlled by the cam 594, this switch being initially closed so that the fluid will be admitted to the gripper cylinders in response to the closing of the switch 582. Pivotally mounted on a pin 724 supported on the plates 720 is an arm 726 provided with a screw 728 in engagement with a switch-controlling pin 730 pressed upward by a spring in the switch. Fast on this arm is a block 732 on the top of which rests a bar 734 pivotally connected to the stud 66 on the arm 68 at the same side of the machine and supported by a collar 736 on the stud, this being the stud about which the corresponding clamp member 64 may turn to adjust itself to the shoe. To assist in preventing upward movement of the bar 734 the plates 720 carry a pin 738 in engagement with the upper face of the bar. Mounted on the bar 734 is a stud 740 having a rounded head projecting from the lower face of the bar and arranged to engage an inclined face 742 on the block 732. It will accordingly be understood that the position of the stud 740 is determined by the positions of the clamp members 64 in engagement with the shoe and will vary in operating on shoes of different widths. As the wipers are moved inwardly toward the shoe the block 732 approaches the stud 740 and upon engagement of this block with the head of the stud the arm 726 is swung downward to open the switch 722 and thus to break the electrical circuit of that solenoid 558 which is associated with the valve for admitting the fluid to the gripper cylinders, thereby causing the fluid to be released from the cylinders. Whatever may be the width of the shoe, therefore, the grippers open and release the upper when the wipers 334 have arrived in the same predetermined relation to the edge of the shoe bottom, thus insuring the proper coordination between the release of the upper by the grippers and the beginning of the wiping action of the wipers thereon.

Figure 17:
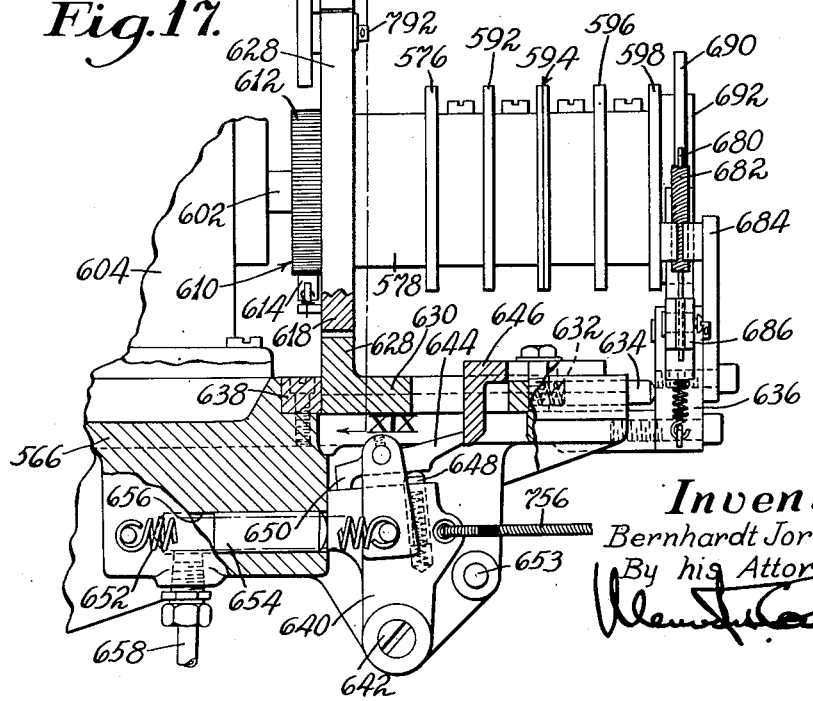
Fig. 17 is a view in front elevation, with parts broken away, of the controlling mechanism shown in Fig. 16.

If the operator desires, he may turn the valve 662 (Fig. 2) into position to prevent delivery of fluid from the pipe 664 to the pipe 658 leading to the cylinder 656 in which the clutch-tripping piston 654 is mounted. Under those conditions the presentation of the shoe to the machine will not result in the tripping of the clutch and the starting of the cycle of operations, but will only result in the development of fluid pressure in the manifold, in the outward movements of the grippers and the holddowns over the shoe and in the inward movements of the clamp members 64. This will enable the operator to observe the conditions when the grippers are in positions for gripping the upper. In the use of the machine in this manner it is necessary to trip the clutch as a distinct operation, and for this purpose there is provided a treadle 744 (Figs. 1 and 20) including a lever 745 pivotally mounted on a rod 746 on the frame and movable by the operator against the resistance of a spring 748 from an initial position determined by engagement of a screw 750 on the lever with a stop face 752 on the frame. An upwardly extending arm 754 of the lever is connected by a flexible cable 756, suitably guided by pulleys 758 and 760 (Fig. 1), to the clutch-tripping arm 640 (Fig. 17). To facilitate use of the treadle by the operator the lever 745 has hinged thereon an extension or foot piece 762 the front end of which is arranged to rest on the floor with the foot piece in an inclined position. Accordingly, while resting the heel of his foot on the floor the operator may readily depress the treadle by pressure of the ball of his foot on the foot piece. When the treadle is not to be used, the foot piece may be swung upward to a position where it is inclined rearwardly against the frame.

In order to prevent accidental or unauthorized tripping of the clutch at any time when the machine is idle, there is pivotally mounted on the frame a latch 764 arranged to extend into a notch in the upper end of the arm 754 of the treadle and thereby to lock the treadle against clutch-tripping movement. Pivotally connected to this latch is a rod 766 extending upwardly through an opening in a plate 768 to which is secured a piston 770 extending downwardly into a cylinder 772 fast on a bracket 774 on the frame. Connected to this bracket and to the plate 768 are two springs 776 which hold the piston initially in a position determined by engagement of a flange on its upper end with the cylinder. A pin 778 mounted in the cylinder 772 and extending through a slot 780 in the piston limits upward movement of the piston. In communication with the lower end of the cylinder is a pipe 782 which leads (Fig. 1) from the pump 476. In response, therefore, to the development of fluid pressure upon the closing of the outlet from the manifold by the valve 506 (Fig. 14) the piston 770 is forced upwardly as far as permitted by the pin 778 and thereby swings the latch 764 in an upward direction to release the treadle, the rod 766 being raised by engagement of the plate 768 with a nut 784 on the rod. This permits the operator to use the treadle if desired. When the fluid pressure is terminated at the end of the cycle the piston 770 is returned by the springs 776, and the latch 764 is returned to its locking position through a spring 786 confined between the plate 768 and a collar 788 fast on the rod 766. It will be evident that if under any conditions the latch should engage the top of the arm 754 before entering the notch in the arm the spring 786 will yield.

Under some conditions it may be desired to bring the machine to a stop at the time in the cycle when the wipers are in their fully closed positions over the shoe bottom to permit them to remain for a few seconds in pressure-applying relation to the overwiped margin of the upper. For this purpose there is secured to the ring 628 (Fig. 19) a bracket 790 provided with a pin 792 on which is pivotally mounted a lever 794. If it is desired to stop the machine at the above-mentioned time in the cycle this lever is swung from an idle position in which it is shown in full lines in Fig. 19 to the position in which it is shown in broken lines, in which position its lower end is in the path of movement of the tail 622 of the pawl 614. Accordingly engagement of the tail of the pawl with that end of the lever will disconnect the pawl from the ratchet wheel 612 and stop the machine. Thereafter the machine will be again started by depression of the treadle 744. In order to swing the lever 794 to its operative position as above described its upper end is connected to one end of a flexible wire cable 796 mounted in a guide 798 one end of which is secured to a holder 800 fast on the bracket 790. The guide 798 leads upwardly and forwardly to a member 802 (Fig. 2) fast on the casting 84, and in this member is slidingly mounted a plunger 804 to which the cable 796 is connected. Movement of the lever 794 to its operative position is therefore effected by pushing rearwardly on the plunger 804 and return of the lever to its idle position is effected by pulling forwardly on the plunger. It will be understood that the machine may thus be stopped at the time when the wipers are over the shoe whether the valve 662 (Fig. 2) is in the position to cause the cycle of operations to be started in response to presentation of the shoe or in position to require a depression of the treadle for this purpose.

Secured to the casting 84 is a forwardly and downwardly inclined shoe receiver 806 in position to receive and support the shoe upon its release by the toe rest 116 substantially at the end of the cycle of operations. Since this shoe receiver is of substantially the same construction as disclosed in the previously mentioned Letters Patent No. 2,423,454, it will not be described in detail. It will be understood that the provision of this shoe receiver enables the operator to have another shoe in his hands ready to present to the machine immediately after the end of the cycle and that he will remove from the shoe receiver the shoe previously operated upon only after the beginning of the operation of the machine on the next shoe.

While the manner of operation of the machine will be understood from the foregoing description, it will now be briefly summarized. Preferably the grippers and the holddowns associated therewith are initially adjusted at such a height by the screw 244 (Figs. 1 and 3) that the inner jaws 132 of the grippers and the presser feet 178 of the holddowns extend downward slightly beyond the presser feet 20 of the shoe rest 18, so that the inner jaws of the grippers will engage the insole as they are moved outwardly toward the edge of the insole even though the bottom of the last has a convex lateral curvature. It will be understood that a shoe as it comes to the machine will have been previously subjected to a pulling-over operation and will also have been lasted along its shank portion. In presenting the shoe to the machine the operator positions it lengthwise as determined by sight with reference to the grippers, having properly adjusted the grippers for a right or a left shoe by the hand lever 322. After properly positioning the shoe in this respect the operator moves it upwardly toward the shoe rest members 18 and 40 and into engagement with the inner jaws 132 of the grippers, as illustrated in Fig. 21. By such upward movement of the shoe the bar 666 guided by the shoe rest member 18 is lifted and, through the mechanism described, closes the two switches 560 and 586 (Fig. 16). The closing of the switch 560 causes the development of fluid pressure in the manifold 486 in response to operation of the valve 506 (Fig. 14), and the closing of the switch 586 causes the delivery of fluid under pressure from the manifold to the cylinder 92 for moving the clamp members 64 inwardly into engagement with the shoe, to the cylinders 252 for moving the grippers and the holddowns outwardly over the insole to the position illustrated in Fig. 22 and, if the valve 662 (Fig. 2) is in open position, to the cylinder 656 (Fig. 17) for actuating the clutch to start the cycle of operations. If the valve 662 is in closed position the fluid will not be delivered to the cylinder 656 and accordingly the operator will be afforded the opportunity to observe conditions before the grippers grip and pull the upper. In that case, he will start the cycle of operations by depression of the treadle 744. As previously explained, the clamp members 64 centralize the shoe between them, and the limits of the outward movements of the grippers and the holddowns over the insole are determined by the positions of these members in engagement with the shoe by reason of the action of the arms 290 (Fig. 6) on the two series of balls 276 through which the pins 282 (Fig. 4) are positioned for limiting the outward movements of the gripper-supporting arms 222.

Substantially at the beginning of the cycle of operations the switch 580 is closed by the cam 592 to cause the toe rest 116 to be moved upwardly. The toe rest thus forces the shoe upwardly against the shoe rest members 18 and 40 which positively determine the height at which the shoe is positioned in the lasting operation and also its position with respect to lateral or longitudinal tipping movements. The cam 594 then closes the switch 582 to cause fluid to be admitted to the gripper cylinders 134, as the result of which the grippers are closed on the margin of the upper and are moved upwardly to pull the upper as illustrated in Fig. 23, the grippers applying their pull to the upper by a purchase on the bottom of the shoe through the holddown bars 176 and the springs 192 in these bars yielding more or less in response to the resistance of the upper to the force of the pull applied thereto. In proper time relation to the pulling of the upper the switch 584 is closed by the cam 596 to admit fluid to the cylinder 418 for operating the wipers, thus causing the arms 360 of the levers 362 to swing inwardly about the studs 366 and, through the links 359, causing these arms to swing the arms 342 inwardly about the axes of the rockshafts 346. By the swinging of the arms 342 the front end portions of the wipers are carried inwardly with substantial components of rearward movement lengthwise of the shoe toward its toe end, and at the same time the arms 360, by the action of the blocks 370 on the rear end portions of the wipers, move these portions also inwardly without any substantial swinging movements of the wipers about the studs 336. The wipers are thus moved bodily inward with substantial components of rearward movement. By the time the wipers arrive in upper-engaging positions, ready to begin their wiping action on the upper, as illustrated in Figs. 24 and 25, the grippers are opened to release the upper by reason of the opening of the switch 722 (Fig. 8) which is in the same circuit as the switch 582 controlled by the cam 594, the opening of the switch 722 being timed in accordance with the positions of the clamp members 64 by engagement of the head of the stud 740 with the block 732. Immediately upon release of the upper by the grippers the holddowns 174 are moved upwardly away from the shoe by the springs 232 previously tensioned by the action of the rear arm 424 of the right-hand lever 362 on the arm 448 (Figs. 1 and 3) fast on the rockshaft 248. This removes the preseer feet 178 of the holddowns from the paths of the wipers and also prevents the grippers from moving downwardly far enough to interfere with the wipers.

Figure 26:
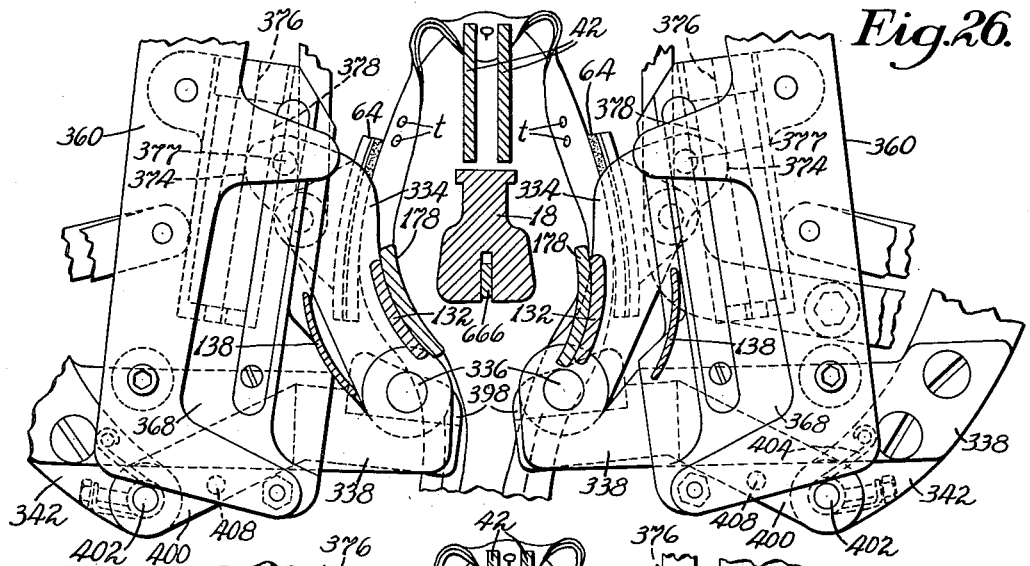
Fig. 26 is a view similar to Fig. 25, showing the parts as they appear at the completion of the bodily inward movements of the wipers.
Figure 27:
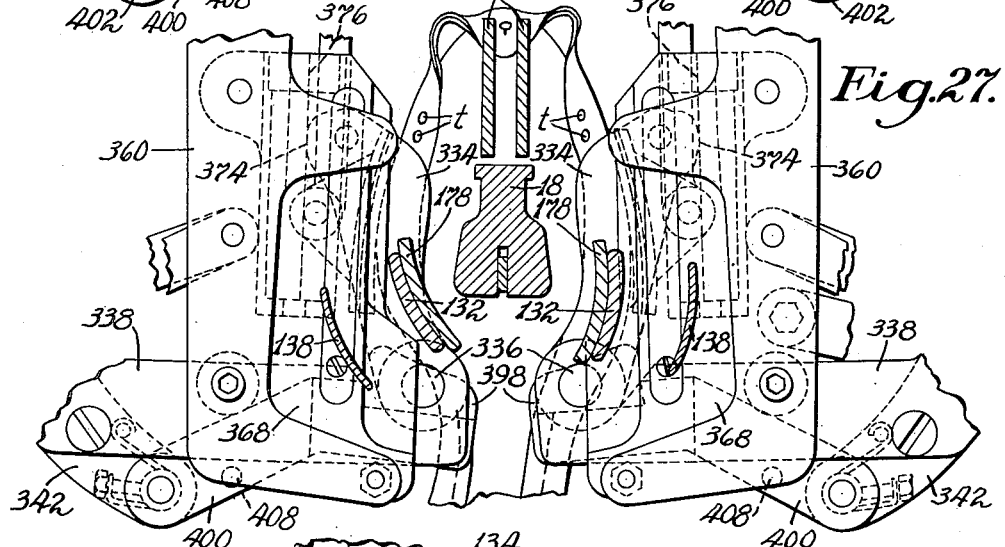
Fig. 27 is a similar view at the completion of the subsequent swinging movements of the wipers.
Figure 28:
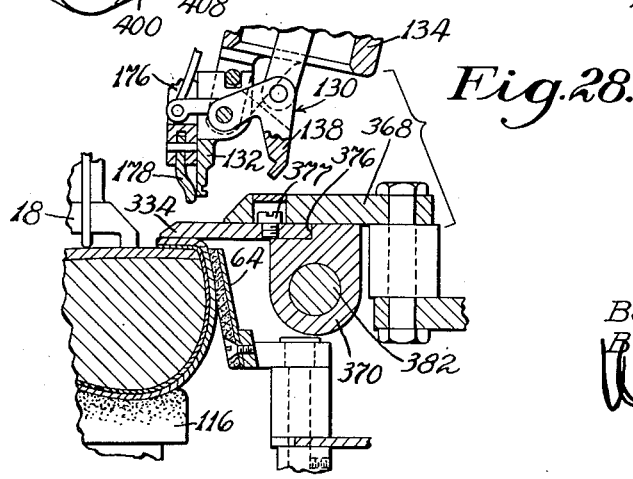
Fig. 28 is a view similar to Fig. 24 with the parts in the same positions as in Fig. 27.

The first portion of the wiping operation of the wipers 334 on the upper is effected by continued bodily movements of the wipers in inward and rearward directions, the supplemental wipers 398 at this time being wedged yieldingly inward by the swinging of the arms 342 between the wipers 334 and the portions of the bottom of the shoe which are inclined downward toward the shank portion of the shoe. When the wipers have thus arrived substantially in the positions illustrated in Fig. 26, the swinging of the arms 342 is stopped by engagement of their tail portions 386 with the heads of the screws 384. Thereafter the continued movements of the levers 362 serve to swing the wipers 334 about the studs 336 to complete the wiping operation, as illustrated in Fig. 27. Substantially at the end of the wiping operation the latch 30 is swung rearwardly to release the lever 16 (Fig. 12) and thereby also to release the lever 60. This permits the shoe to be forced more firmly up against the wipers by the toe rest 116 to increase their pressure on the margin of the upper. Since the screws 454 on the rear end of the lever 60 permit only a very short upward movement of the shoe rest member 40 which engages the bottom of the toe end of the shoe, while the shoe rest member 18 engaging the ball portion of the shoe can move farther upwardly, the tendency of the toe rest is to rock the shoe in the direction to raise its heel end. This insures that adequate pressure will be applied by the wipers to the portions of the overwiped margin of the upper located near the beginning of the shank portion of the shoe.

If the operator has moved the clutch-controlling lever 794 (Fig. 19) to its operative position by means of the plunger 804 at the front of the machine, the machine comes automatically to a stop at the end of the wiping operation with the wipers in pressure-applying relation to the margin of the upper to allow more time for the cement to set. In that case the operator, after a few seconds, starts the machine again by depression of the treadle 744. If the machine is not stopped automatically at that time, it continues to the end of the cycle, returning the various parts to their starting positions, the valve 506 (Fig. 14) being returned to its initial position at the end of the cycle to open the outlet from the manifold 486 in response to the opening of the switch 560 under control of the cam 576. When the shoe is released by the downward movement of the toe rest it falls upon the inclined shoe receiver 806 by which it is supported until the operator removes it after presenting the next shoe to the machine.

Having described the invention, what I claim as new and desire to secure by Letters Patent of the United States is:

1. In a lasting machine, overlaying means movable to lay the marginal portion of an upper on a last inwardly over an insole on the last, upper-gripping means supported independently of said overlaying means for gripping the marginal portion of the upper and for pulling the upper prior to the action of the overlaying means thereon, a member arranged to be positioned as determined by engagement with the upper in a location adjacent to the edge of the insole, and automatic means controlled by said member for causing the upper-gripping means to release the upper at a time in the movement of the overlaying means determined by the position of said member.

2. In a lasting machine, overlaying means movable to lay the marginal portion of an upper on a last inwardly over an insole on the last, upper-gripping means for gripping the marginal portion of the upper, said upper-gripping means being mounted for movement heightwise of the last relatively to the overlaying means to pull the upper prior to the action of the overlaying means thereon, a member arranged to be positioned as determined by engagement with the upper in a location substantially opposite the edge of the last bottom, and automatic means controlled by said member for causing the upper-gripping means to release the upper at a time in the movement of the overlaying means determined by the position of said member.

3. In a lasting machine, overlaying means mounted to move relatively to a shoe on a last to lay the marginal portion of the upper inwardly over the bottom of the last, upper-gripping means for gripping the marginal portion of the upper and for pulling the upper prior to the action of the overlaying means thereon, and electrical means controlled by the shoe for causing the upper-gripping means to release the upper at a time in the movement of the overlaying means determined by the shoe.

4. In a lasting machine, overlaying means mounted to move relatively to a shoe on a last to lay the marginal portion of the upper inwardly over the bottom of the last, upper-gripping means for gripping the marginal portion of the upper and for pulling the upper prior to the action of the overlaying means thereon, an electrical switch, means for causing the upper-gripping means to release the upper in response to operation of said switch, and means for thus operating the switch in response to the movement of the overlaying means at a time in that movement determined by the shoe.

5. In a lasting machine, overlaying means movable to lay the marginal portion of an upper on a last inwardly over an insole on the last, upper-gripping means for gripping the marginal portion of the upper and for pulling the upper prior to the action of the overlaying means thereon, a member arranged to be positioned as determined by engagement with the upper, and electrical means controlled by said member for causing the upper-gripping means to release the upper at a time in the movement of the overlaying means determined by the position of said member.

6. In a lasting machine, overlaying means movable to lay the marginal portion of an upper on a last inwardly over an insole on the last, upper-gripping means for gripping the marginal portion of the upper and for pulling the upper prior to the action of the overlaying means thereon, a member arranged to be positioned as determined by engagement with the upper, an electrical switch, means for causing the upper-gripping means to release the upper in response to operation of said switch, and means for thus operating said switch in response to the movement of the overlaying means at a time in that movement determined by the position of said member.

7. In a lasting machine, overlaying means movable to lay the marginal portion of an upper on a last inwardly over an insole on the last, upper-gripping means for gripping the marginal portion of the upper and for pulling the upper prior to the action of the overlaying means thereon, a member arranged to be positioned as determined by engagement with the upper, an electrical switch movable bodily by the overlaying means, means for causing the upper-gripping means to release the upper in response to operation of said switch, and a device positioned by said member for thus operating the switch at a time in its bodily movement determined by the position of said member.

8. In a lasting machine, overlaying means movable to lay the marginal portion of an upper on a last inwardly over an insole on the last, upper-gripping means for gripping the marginal portion of the upper and for pulling the upper prior to the action of the overlaying means thereon, a member arranged to be positioned as determined by engagement with the upper, means for causing said upper-gripping means to release the upper in response to the breaking of an electrical circuit, and means positioned as determined by said member for breaking said circuit in response to the movement of the overlaying means.

9. In a lasting machine, overlaying means mounted to move relatively to a shoe on a last to lay the marginal portion of the upper inwardly over the bottom of the last, upper-gripping means for gripping the marginal portion of the upper and for pulling the upper prior to the action of the overlaying means thereon, fluid-operated means for closing said upper-gripping means on the upper, a valve for releasing operating fluid from said fluid-operated means to cause the upper-gripping means to release the upper, and means controlled by the shoe for causing said valve thus to release the fluid at a time in the movement of the overlaying means determined by the shoe.

10. In a lasting machine, overlaying means mounted to move relatively to a shoe on a last to lay the marginal portion of the upper inwardly over the bottom of the last, upper-gripping means for gripping the marginal portion of the upper and for pulling the upper prior to the action of the overlaying means thereon, fluid-operated means for closing said upper gripping means on the upper, a valve movable to release operating fluid from said fluid-operated means to cause the upper-gripping means to release the upper, and electrical means controlled by the shoe for causing said valve thus to move in response to the movement of the overlaying means at a time in that movement determined by the shoe.

11. In a lasting machine, overlaying means movable to lay the marginal portion of an upper on a last inwardly over an insole on the last, upper-gripping means for gripping the marginal portion of the upper and for pulling the upper prior to the action of the overlaying means thereon, fluid-operated means for closing said upper-gripping means on the upper, a valve for releasing operating fluid from said fluid-operated means to cause the upper-gripping means to release the upper, a member arranged to be positioned as determined by engagement with the upper, and means controlled by said member for causing said valve thus to release the fluid at a time in the movement of the overlaying means determined by the position of said member.

12. In a lasting machine, overlaying means movable to lay the marginal portion of an upper on a last inwardly over an insole on the last, upper-gripping means for gripping the marginal portion of the upper and for pulling the upper prior to the action of the overlaying means thereon, fluid-operated means for closing said upper-gripping means on the upper, a valve movable to release operating fluid from said fluid-operated means to cause the upper-gripping means to release the upper, a member arranged to be positioned as determined by engagement with the upper, and electrical means controlled by said member for causing said valve thus to move at a time in the movement of the overlaying means determined by the position of said member.

13. In a lasting machine, overlaying means movable to lay the marginal portion of an upper on a last inwardly over an insole on the last, upper-gripping means for gripping the marginal portion of the upper and for pulling the upper prior to the action of the overlaying means thereon, fluid-operated means for closing said upper-gripping means on the upper, a valve movable to release operating fluid from said fluid-operated means to cause the upper-gripping means to release the upper, a spring for thus moving said valve in response to the breaking of an electrical circuit, a member arranged to be positioned as determined by engagement with the upper, and means controlled by said member for breaking said circuit at a time in the movement of the overlaying means determined by the position of said member.

14. In a lasting machine, overlaying means movable to lay the marginal portion of an upper on a last inwardly over an insole on the last, upper-gripping means for gripping the marginal portion of the upper and for pulling the upper prior to the action of the overlaying means thereon, fluid-operated means for closing said upper-gripping means on the upper, a valve movable to admit operating fluid to said fluid-operated means thus to close the upper-gripping means, electrical means for thus moving said valve in response to the closing of an electrical circuit, a member arranged to be positioned as determined by engagement with the upper, a switch in said electrical circuit movable bodily by the overlaying means, a device positioned by said member for opening said switch to break the circuit in response to the movement of the overlaying means, and a spring for moving the valve to release fluid from said fluid-operated means and thus to cause the upper-gripping means to release the upper in response to the breaking of said circuit.

15. In a lasting machine, overlaying devices mounted for movements toward each other widthwise of a shoe on a last to lay the marginal portion of the upper inwardly over the bottom of the last, grippers supported independently of said overlaying devices for gripping the marginal portion of the upper at the opposite sides of the last and for pulling the upper heightwise of the last prior to the action of said overlaying devices thereon, and means controlled by engagement with the opposite sides of the shoe for causing said grippers to release the upper at a time in the movements of the overlaying devices determined by the width of the shoe.

16. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of said overlaying devices thereon, and electrical means controlled by the shoe for causing the grippers to release the upper at a time in the movements of the overlaying devices determined by the width of the shoe.

17. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of said overlaying devices thereon, an electrical switch, means for causing said grippers to release the upper in response to operation of said switch, and automatic means for thus operating said switch at a time in the movements of the overlaying devices determined by the width of the shoe.

18. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of said overlaying devices thereon, fluid-operated means for closing said grippers on the upper, valve mechanism for releasing operating fluid from said fluid-operated means to cause the grippers to release the upper, and means controlled by engagement with the opposite sides of the shoe for causing said valve mechanism thus to release the fluid at a time in the movements of the overlaying devices determined by the width of the shoe.

19. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of said overlaying devices thereon, fluid-operated means for closing said grippers on the upper, valve mechanism movable to release operating fluid from said fluid-operated means to cause the grippers to release the upper, and electrical means controlled by the shoe for causing said valve mechanism thus to move at a time in the movements of the overlaying devices determined by the width of the shoe.

20. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, members arranged to engage the opposite sides of the shoe respectively and connected together for equal movements widthwise of the shoe to positions determined by the shoe, mechanism for causing the grippers to release the upper, and automatic means for variably timing the action of said mechanism in accordance with the positions of said members.

21. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, members arranged to engage the opposite sides of the shoe respectively and connected together for equal movements widthwise of the shoe to positions determined by the shoe, electrical means including a switch arranged to be operated to cause said grippers to release the upper, and automatic means for variably timing the action of said switch in accordance with the positions of said members.

22. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, members arranged to engage the opposite sides of the shoe respectively and connected together for equal movements widthwise of the shoe to positions determined by the shoe, electrical means including a switch arranged to be operated in response to the movement of one of said overlaying devices to cause the grippers to release the upper, and means for timing the operation of said switch in accordance with the positions of said members.

23. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, members arranged to engage the opposite sides of the shoe respectively and connected together for equal movements widthwise of the shoe to positions determined by the shoe, means for causing said grippers to release the upper in response to the breaking of an electrical circuit, a switch for breaking said circuit, and means for thus operating said switch at a time determined by the positions of said members.

24. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, fluid-operated means for closing said grippers on the upper, a valve for releasing operating fluid from said fluid-operated means to cause the grippers to release the upper, members arranged to engage the opposite sides of a shoe respectively and connected together for equal movements widthwise of the shoe to positions determined by the shoe, and means for causing said valve thus to release the fluid at a time in the movements of the overlaying devices depending upon the positions of said members.

25. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, fluid-operated means for closing said grippers on the upper, a valve movable to release operating fluid from said fluid-operated means to cause the grippers to release the upper, members arranged to engage the opposite sides of the shoe respectively and connected together for equal movements widthwise of the shoe to positions determined by the shoe, and electrical means controlled by one of said members for causing said valve thus to move at a time in the movements of the overlaying devices depending upon the positions of said members.

26. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, clamp members arranged to engage the opposite sides of the shoe respectively, means for moving said clamp members equal distances toward each other to position the shoe between them regardless of its width, mechanism for causing said grippers to release the upper, and automatic means for variably timing the action of said mechanism in accordance with the positions of said members.

27. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, clamp members arranged to engage the opposite sides of the shoe respectively, means for moving said clamp members equal distances toward each other to position the shoe between them regardless of its width, and electrical means controlled by one of said clamp members for causing said grippers to release the upper at a time in the movements of the overlaying devices determined by the positions of said members.

28. In a lasting machine, overlaying devices mounted for movements toward each other widthwise of a shoe on a last to lay the marginal portion of the upper inwardly over the bottom of the last, grippers for gripping the marginal portion of the upper at the opposite sides of the last and for pulling the upper heightwise of the last prior to the action of the overlaying devices thereon, fluid-operated means for closing said grippers on the upper, valve mechanism movable to release operating fluid from said fluid-operated means to cause the grippers to release the upper, clamp members arranged to engage the opposite sides of the shoe respectively, means for moving said clamp members equal distances toward each other to position the shoe between them regardless of its width, and electrical means controlled by one of said clamp members for causing said valve mechanism thus to move at a time in the movements of the overlaying devices determined by the positions of said members.

29. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, and means controlled by the shoe and relatively to which the grippers are thus movable for limiting said positioning movements of the grippers in accordance with the width of the shoe.

30. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, members arranged to engage the opposite sides of the shoe respectively regardless of its width, and means controlled by said members for limiting said positioning movements of the grippers in accordance with the positions of said members.

31. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, members connected together for equal movements toward or from each other in directions widthwise of the shoe and arranged to engage the opposite sides of the shoe respectively to position the shoe between them regardless of its width, and means controlled by said members for limiting said positioning movements of the grippers in accordance with the width of the shoe.

32. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, devices associated respectively with the different grippers for limiting their positioning movements, and means controlled by the shoe for determining the limiting positions of said devices in accordance with the width of the shoe.

33. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, devices associated respectively with the different grippers for limiting their positioning movements, members mounted for movements relatively to each other in directions widthwise of the shoe for engaging the opposite sides of the shoe respectively regardless of its width, and means controlled by said members for determining the limiting positions of said devices in accordance with the positions of said members.

34. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, stops associated respectively with the different grippers for limiting their positioning movements, clamp members mounted for movements toward each other widthwise of the shoe for engaging the opposite sides of the shoe respectively regardless of its width, and means for determining the positions of said stops by the positions of said clamp members.

35. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, stops associated respectively with the different grippers for limiting their positioning movements, members arranged to engage the opposite sides of the shoe respectively regardless of its width, levers for supporting said members and for moving them inwardly into engagement with the shoe, and means controlled by said levers for positioning said stops as determined by the positions of said members.

36. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, stops associated respectively with the different grippers for limiting their positioning movements, two series of balls leading respectively from the different stops for controlling them, members mounted for movements relatively to each other in directions widthwise of the shoe for engaging the opposite sides of the shoe respectively regardless of its width, and means arranged to act through said series of balls to position said stops as determined by the positions of said members.

37. In a lasting machine, grippers for gripping the marginal portion of the upper of a shoe on a last at the opposite sides of the last respectively and for pulling the upper, means for imparting to said grippers positioning movements in directions away from each other widthwise of the last after the shoe has been presented to the machine but before they grip the upper, stops associated respectively with the different grippers for limiting their positioning movements, tubes in end portions of which said stops are movably mounted, each tube having a series of balls therein, movable members in the other ends of said tubes, clamp members for engaging the opposite sides of the shoe, and levers for supporting said clamp members and for moving them inwardly against the shoe, said levers being arranged to engage said movable members and to act through the series of balls to position the stops as determined by the positions of the clamp members.

38. In a lasting machine, grippers for gripping the marginal portion of the upper of a shoe on a last at the opposite sides of the ball portion of the shoe respectively and for pulling the upper, means supporting said grippers for movements about separate axes extending heightwise of the shoe in locations farther from the sides of the shoe than the grippers to shift them bodily in directions lengthwise of the shoe and to change their angular relation to the sides of the shoe, a lever extending generally widthwise of the shoe and mounted between its ends to swing about an axis extending heightwise of the shoe, links extending generally lengthwise of the shoe and connecting the two arms of said lever respectively to the different grippers, and a member connected to the lever for swinging it to move the grippers simultaneously in opposite directions respectively about said axes to positions for operating on a right shoe and to other positions for operating on a left shoe.

39. In a lasting machine, lasting devices arranged to operate respectively on the opposite side portions of a shoe presented thereto by the operator and positioned lengthwise as determined by sight, power-operated means for operating said lasting devices, and mechanism for starting the power operation of the machine in response to movement of the shoe heightwise by the operator after he has thus presented it in proper position lengthwise relatively to said devices.

40. In a lasting machine, lasting devices arranged to operate respectively in a cycle of power operations of the machine on the opposite side portions of a shoe presented thereto by the operator and positioned lengthwise as determined by sight, and means including a member arranged to be engaged by the bottom of the shoe to cause the starting of the cycle of operations in response to movement of the shoe heightwise by the operator after he has thus positioned it lengthwise in proper relation to said devices.

41. In a lasting machine, lasting device arranged to operate respectively on the opposite side portions of a shoe presented thereto by the operator and positioned lengthwise as determined by sight, power-operated means for operating said lasting devices, a shoe rest for engaging the bottom of the shoe to determine the position of the shoe heightwise in the lasting operation, a member arranged to extend initially beyond said shoe rest toward the bottom of the shoe and to be operated by movement of the shoe heightwise toward the shoe rest by the operator after he has thus positioned the shoe lengthwise in proper relation to the lasting devices, and means for starting the power operation of the machine in response to such operation of said member.

42. In a fluid-operated shoe machine, fluid-operated means for operating on a shoe presented thereto by the operator in a cycle of power operations of the machine, a clutch arranged to be actuated to start the cycle of operations, fluid-operated means for thus actuating said clutch, a pump for normally circulating operating fluid without developing any substantial fluid pressure, a valve for interrupting such circulation of fluid to cause the development of fluid pressure, another valve for opening communication between the pump and the fluid-operated means for actuating the clutch, and means for operating both said valves in response to movement of the shoe heightwise in the presentation of the shoe to the machine.

43. In a fluid-operated machine, fluid-operated means for operating on a shoe presented thereto by the operator in a cycle of power operations of the machine, a clutch arranged to be actuated to start the cycle of operations, fluid-operated means for thus actuating said clutch, a pump for normally circulating operating fluid without developing any substantial fluid pressure, a valve for interrupting such circulation of fluid to cause the development of fluid pressure, another valve for opening communication between the pump and the fluid-operated means for actuating the clutch, solenoids associated respectively with said different valves for operating them electrically, switches for closing the electrical circuits of said solenoids, and means for thus operating said switches by movement of the shoe heightwise in the presentation of the shoe to the machine.

44. In a shoe machine, means for operating on a shoe presented thereto by the operator in a cycle of power operations of the machine, a member movable to start the cycle of operations in response to the presentation of the shoe in a given position, means for alternatively preventing such shoe-controlled starting of the cycle notwithstanding the presentation of the shoe in that position, and means movable by the operator when the starting of the cycle by the shoe is thus prevented for moving said member independently of the shoe and thereby starting the cycle after the shoe has thus been presented.

45. In a shoe machine, means for operating on a shoe presented thereto by the operator in a cycle of power operations of the machine, a clutch arranged to be actuated to start the cycle of operations, a member movable thus to actuate said clutch in response to the presentation of the shoe, means for alternatively preventing such shoe-controlled actuation of the clutch, and means movable by the operator under those conditions to move said member and thereby to actuate the clutch.

46. In a shoe machine, means for operating on a shoe presented thereto by the operator in a cycle of power operations of the machine, a clutch arranged to be actuated to start the cycle of operations, fluid-operated means for thus actuating said clutch in response to the presentation of the shoe, a valve movable into position to prevent such shoe-controlled actuation of the clutch by preventing delivery of fluid to said fluid-operated means, and means movable by the operator when the valve is in that position to actuate the clutch independently of the fluid.

47. In a lasting machine, grippers for gripping the marginal portion of the upper of a shoe on a last at the opposite sides of the last respectively and for pulling the upper, power-operated means for imparting to said grippers in response to presentation of the shoe to the machine positioning movements in directions away from each other widthwise of the last before they grip the upper, and additional power-operated means for operating the grippers thereafter to grip and pull the upper either in response to the presentation of the shoe or independently of control by the shoe.

48. In a lasting machine, grippers for gripping the marginal portion of the upper of a shoe on a last at the opposite sides of the last respectively and for pulling the upper, power-operated means for imparting to said grippers in response to presentation of the shoe to the machine positioning movements in directions away from each other widthwise of the last before they grip the upper, additional power-operated means for operating said grippers thereafter to grip and pull the upper also in response to the presentation of the shoe, means for alternatively preventing such shoe-controlled operation of said additional power-operated means, and means movable by the operator under those conditions to cause the operation of said additional means.

49. In a lasting machine, grippers for gripping the marginal portion of the upper of a shoe on a last at the opposite sides of the last respectively and for pulling the upper, fluid-operated means for imparting to said grippers in response to presentation of the shoe to the machine positioning movements in directions away from each other widthwise of the last before they grip the upper, additional fluid-operated means for operating said grippers thereafter to grip and pull the upper also in response to the presentation of the shoe, a valve movable alternatively into position to prevent such shoe-controlled operation of said additional fluid-operated means, and means movable by the operator when the valve is in that position to cause the operation of said additional means.

50. In a lasting machine, grippers for gripping the marginal portion of the upper of a shoe on a last at the opposite sides of the last respectively and for pulling the upper in a cycle of power operations of the machine, power-operated means for imparting to said grippers independently of said cycle of operations positioning movements in directions away from each other widthwise of the last in response to presentation of the shoe to the machine, and means for starting the cycle of operations either in response to the presentation of the shoe or independently of control by the shoe after the shoe has been presented.

51. In a lasting machine, grippers for gripping the marginal portion of the upper of a shoe on a last at the opposite sides of the last respectively and for pulling the upper in a cycle of power operations of the machine, power-operated means for imparting to said grippers independently of said cycle of operations positioning movements in directions away from each other widthwise of the last in response to presentation of the shoe to the machine, means for starting the cycle of operations also in response to the presentation of the shoe, means for alternatively preventing such shoe-controlled starting of the cycle of operations, and additional means movable by the operator under those conditions to start the cycle.

52. In a lasting machine, grippers for gripping the marginal portion of the upper of a shoe on a last at the opposite sides of the last respectively and for pulling the upper in a cycle of power operations of the machine, a clutch arranged to be actuated to start the cycle of operations, power-operated means for imparting to said grippers independently of said cycle of operations positioning movements in directions away from each other widthwise of the last in response to presentation of the shoe to the machine, means for actuating said clutch to start the cycle also in response to the presentation of the shoe, means for alternatively preventing such shoe-controlled actuation of the clutch, and additional means movable by the operator under those conditions to actuate the clutch.

53. In a lasting machine, grippers for gripping the marginal portion of the upper of a shoe on a last at the opposite sides of the last respectively and for pulling the upper in a cycle of power operations of the machine, a clutch arranged to be actuated to start the cycle of operations, fluid-operated means for imparting to said grippers independently of said cycle of operations positioning movements in directions away from each other widthwise of the last in response to presentation of the shoe to the machine, additional fluid-operated means for actuating said clutch to start the cycle of operations also in response to the presentation of the shoe, a valve movable alternatively into position to prevent such shoe-controlled actuation of the clutch, and means movable by the operator when the valve is in that position to actuate the clutch.

54. In a lasting machine, grippers for gripping the marginal portion of the upper of a shoe on a last at the opposite sides of the last respectively and for pulling the upper, fluid-operated means for imparting to said grippers positioning movements in directions away from each other widthwise of the last after the shoe has been presented to the machine but before they grip the upper, a valve for admitting operating fluid to said fluid-operated means, a solenoid for thus operating said valve electrically, a switch for closing the electrical circuit of said solenoid, and means movable by the shoe thus to operate said switch in the presentation of the shoe to the machine.

55. In a lasting machine, grippers for gripping the marginal portion of the upper of a shoe on a last at the opposite sides of the last respectively and for pulling the upper in a cycle of power operations of the machine, fluid-operated means for imparting to said grippers positioning movements in directions away from each other widthwise of the last after the shoe has been presented to the machine but before they grip the upper, a valve for admitting operating fluid to said fluid-operated means, a solenoid for thus operating said valve electrically, a switch for closing the electrical circuit of said solenoid, means movable by the shoe thus to operate said switch in the presentation of the shoe to the machine, and fluid-operated means also controlled by said valve for starting the cycle of operations of the machine.

56. In a lasting machine, grippers for gripping the marginal portion of the upper of a shoe on a last at the opposite sides of the last respectively and for pulling the upper in a cycle of power operations of the machine, fluid-operated means for imparting to said grippers positioning movements in directions away from each other widthwise of the last after the shoe has been presented to the machine but before they grip the upper, a valve for admitting operating fluid to said fluid-operated means, a solenoid for thus operating said valve electrically, a switch for closing the electrical circuit of said solenoid, means movable by the shoe thus to operate said switch in the presentation of the shoe to the machine, a clutch arranged to be actuated to start the cycle of operations, and fluid-operated means also controlled by said valve for thus actuating said clutch.

57. In a lasting machine, grippers for gripping the marginal portion of the upper of a shoe on a last at the opposite sides of the last respectively and for pulling the upper, fluid-operated means for imparting to said grippers positioning movements in directions away from each other widthwise of the last after the shoe has been presented to the machine but before they grip the upper, a valve for admitting operating fluid to said fluid-operated means, a pump for normally circulating operating fluid without developing any substantial fluid pressure, a valve for interrupting such circulation of fluid to cause the development of fluid pressure, solenoids associated respectively with said different valves for operating them electrically, switches for closing respectively the electrical circuits of said solenoids, and means movable by the shoe thus to operate both said switches in the presentation of the shoe to the machine.

58. In a lasting machine, grippers for gripping the marginal portion of the upper of a shoe on a last at the opposite sides of the last respectively and for pulling the upper in a cycle of power operations of the machine, fluid-operated means for imparting to said grippers positioning movements in directions away from each other widthwise of the last after the shoe has been presented to the machine but before they grip the upper, a valve for admitting operating fluid to said fluid-operated means, a pump for normally circulating operating fluid without developing any substantial fluid pressure, a valve for interrupting such circulation of fluid to cause the development of fluid pressure, solenoids associated respectively with said different valves for operating them electrically, switches for closing respectively the electrical circuits of said solenoids, means movable by the shoe thus to operate both said switches in the presentation of the shoe to the machine, and fluid-operated means also controlled by said first-named valve for starting the cycle of operations of the machine.

59. In a lasting machine, grippers for gripping the marginal portion of the upper of a shoe on a last at the opposite sides of the last respectively and for pulling the upper in a cycle of power operations of the machine, fluid-operated means for imparting to said grippers positioning movements in directions away from each other widthwise of the last after the shoe has been presented to the machine but before they grip the upper, a valve for admitting operating fluid to said fluid-operated means, a pump for normally circulating operating fluid without developing any substantial fluid pressure, a valve for interrupting such circulation of fluid to cause the development of fluid pressure, solenoids associated respectively with said different valves for operating them electrically, switches for closing respectively the electrical circuits of said solenoids, means movable by the shoe thus to operate both said switches in the presentation of the shoe to the machine, a clutch arranged to be actuated to start the cycle of operations, and fluid-operated means also controlled by said first-named valve for thus actuating said clutch.

60. In a lasting machine, grippers for gripping the marginal portion of the upper of a shoe on a last at the opposite sides of the last respectively and for pulling the upper, clamp members arranged to engage the opposite sides of the shoe respectively, and power-operated means for imparting to said grippers positioning movements in directions away from each other widthwise of the last after the shoe has been presented to the machine but before they grip the upper and for also moving said clamp members inwardly toward each other to position the shoe between them while the shoe is free to shift laterally.

61. In a lasting machine, grippers for gripping the marginal portion of the upper of a shoe on a last at the opposite sides of the last respectively and for pulling the upper, clamp members arranged to engage the opposite sides of the shoe respectively, a shoe rest for engaging the bottom of the shoe to position the shoe heightwise, a toe rest for clamping the shoe against said shoe rest, and power-operated means for imparting to said grippers positioning movements in directions away from each other widthwise of the last after the shoe has been presented to the machine but before they grip the upper and for also moving said clamp members inwardly toward each other to position the shoe laterally before it is clamped by the toe rest against the shoe rest.

62. In a lasting machine, grippers for gripping the marginal portion of the upper of a shoe on a last at the opposite sides of the last respectively and for pulling the upper, clamp members arranged to engage the opposite sides of the shoe respectively, and power-operated means for imparting to said grippers positioning movements in directions away from each other widthwise of the last before they grip the upper and for also moving said clamp members inwardly toward each other to position the shoe laterally in response to the presentation of the shoe to the machine.

63. In a lasting machine, grippers for gripping the marginal portion of the upper of a shoe on a last at the opposite sides of the last respectively and for pulling the upper in a cycle of power operations of the machine, clamp members arranged to engage the opposite sides of the shoe respectively, and power-operated means for imparting to said grippers positioning movements in directions away from each other widthwise of the last before they grip the upper and for also moving said clamp members inwardly toward each other to position the shoe between them independently of said cycle of operations in response to presentation of the shoe to the machine.

64. In a lasting machine, grippers for gripping the marginal portion of the upper of a shoe on a last at the opposite sides of the last respectively and for pulling the upper in a cycle of power operations of the machine, clamp members for engaging the opposite sides of the shoe respectively, power-operated means for imparting to said grippers positioning movements in directions away from each other widthwise of the last before they grip the upper and for also moving said clamp members inwardly toward each other to position the shoe between them independently of said cycle of operations in response to presentation of the shoe to the machine, means for starting the cycle of operations also in response to the presentation of the shoe, and alternative means movable by the operator to start the cycle independently of control by the shoe after the positioning movements of the grippers and the inward movements of the clamp members.

65. In a lasting machine, grippers for gripping the marginal portion of the upper of a shoe on a last at the opposite sides of the last respectively and for pulling the upper in a cycle of power operations of the machine, clamp members arranged to engage the opposite sides of the shoe respectively, fluid-operated means controlled by the shoe for imparting to said grippers positioning movements in directions away from each other widthwise of the last before they grip the upper and for also moving said clamp members inwardly toward each other to position the shoe between them independently of said cycle of operations in response to presentation of the shoe to the machine, and additional fluid-operated means for starting the cycle of operations also in response to the presentation of the shoe.

66. In a lasting machine, lasting devices arranged to operate respectively on the opposite sides of the ball portion of a shoe on a last, clamp members arranged to engage the opposite sides of the ball portion of the shoe respectively, and power-operated means for moving said clamp members inwardly toward each other to position the shoe between them while the shoe is supported wholly by the operator and is free to shift laterally prior to the operation of said lasting devices on the shoe.

67. In a lasting machine, lasting devices arranged to operate respectively on the opposite side portions of a shoe on a last, clamp members arranged to engage the opposite sides of the forepart of the shoe respectively, a shoe rest for engaging the bottom of the forepart of the shoe to position the shoe heightwise relatively to said lasting devices, a toe rest for clamping the shoe against said shoe rest, and power-operated means for moving said clamp members equal distances inwardly toward each other to position the shoe laterally before it is clamped by the toe rest against the shoe rest.

68. In a lasting machine, lasting devices arranged to operate respectively on the opposite side portions of a shoe on a last in a cycle of power operations of the machine, clamp members arranged to engage the opposite sides of the shoe respectively, and power-operated means for moving said clamp members inwardly toward each other to position the shoe between them independently of said cycle of operations in response to presentation of the shoe to the machine.

69. In a lasting machine, lasting devices arranged to operate respectively on the opposite side portions of a shoe on a last in a cycle of power operations of the machine, clamp members arranged to engage the opposite sides of the shoe respectively, and fluid-operated means controlled by the shoe for moving said clamp members inwardly toward each other to position the shoe between them in response to presentation of the shoe to the machine while the shoe is free to shift laterally.

70. In a lasting machine, lasting devices arranged to operate respectively on the opposite side portions of a shoe on a last in a cycle of power operations of the machine, clamp members arranged to engage the opposite sides of the shoe respectively, fluid-operated means for moving said clamp members inwardly toward each other to position the shoe between them while the shoe is free to shift laterally prior to the operation of said lasting devices on the shoe, electrically operated valve means for admitting operating fluid to said fluid-operated means, and circuit-closing means movable by the shoe to cause said valve means thus to operate in response to presentation of the shoe to the machine.

71. In a lasting machine, wipers for wiping the marginal portion of the upper of a shoe on a last inwardly over the bottom of the last at the opposite sides of the ball portion of the shoe respectively, and means for moving said wipers bodily inward widthwise of the shoe with components of movement lengthwise of the shoe toward its toe end to begin the wiping operation on the upper and for swinging them inward about axes located heelwardly of the ball line of the shoe to complete the wiping operation.

72. In a lasting machine, wipers for wiping the marginal portion of the upper of a shoe on a last inwardly over the bottom of the last at the opposite sides of the ball portion of the shoe respectively, and means for moving said wipers bodily inward widthwise of the shoe with components of movement lengthwise of the shoe toward its toe end to begin the wiping operation on the upper and for thereafter swinging them inward about axes located substantially at portions thereof which are farthest from the toe end of the shoe to complete the wiping operation.

73. In a lasting machine, wipers for wiping the marginal portion of the upper of a shoe on a last inwardly over the bottom of the last at the opposite sides of the ball portion of the shoe respectively, members mounted for inward movements widthwise of the shoe to control the portions of said wipers located farthest from the toe end of the shoe, other members mounted for inward movements to control the portions of the wipers located nearest the toe end of the shoe, and means for operating all said members to impart to the wipers bodily inward movements with components of movement lengthwise of the shoe toward its toe end to begin the wiping operation on the upper and for further operating said other members to swing the wipers about axes carried by said first-named members for completing the wiping operation.

74. In a lasting machine, wipers for wiping the marginal portion of the upper of a shoe on a last inwardly over the bottom of the last at the opposite sides of the ball portion of the shoe respectively, members mounted for inward movements widthwise of the shoe and having pivotally supported thereon portions of said wipers located farthest from the toe end of the shoe, other members mounted for inward movements and having means for slidingly engaging and guiding portions of the wipers located nearest the toe end of the shoe, and means for operating all said members to impart to the wipers bodily inward movements with components of movement lengthwise of the shoe toward its toe end to begin the wiping operation on the upper and for thereafter continuing the operation of said other members alone to swing the wipers relatively to said first-named members for completing the wiping operation.

75. In a lasting machine, wipers for wiping the marginal portion of the upper of a shoe on a last inwardly over the bottom of the last at the opposite sides of the ball portion of the shoe respectively, members mounted for inward movements widthwise of the shoe and having pivotally supported thereon portions of said wipers located farthest from the toe end of the shoe, other members mounted for inward movements to control the portions of the wipers located nearest the toe end of the shoe, means for thus moving said other members and for yieldingly moving the first-named members by the movements of said other members to carry the wipers bodily inward widthwise of the shoe, and means for stopping the movements of said first-named members prior to the completion of the movements of said other members to cause the wipers to be swung relatively to the first-named members by continued movements of said other members.

76. In a lasting machine, wipers for wiping the marginal portion of the upper of a shoe on a last inwardly over the bottom of the last at the opposite sides of the ball portion of the shoe respectively, arms mounted for swinging movements widthwise of the shoe about axes extending heightwise of the shoe to control the portions of said wipers located farthest from the toe end of the shoe, other arms mounted for swinging movements about axes extending heightwise of the shoe to control the portions of the wipers located nearest the toe end of the shoe, and means for thus swinging all said arms to impart to the wipers first bodily inward movements with components of movement lengthwise of the shoe toward its toe end and for thereafter continuing the swinging movements of said other arms to swing the wipers relatively to the first-named arms about axes located substantially at portions thereof which are farthest from the toe end of the shoe.

77. In a lasting machine, wipers for wiping the marginal portion of the upper of a shoe on a last inwardly over the bottom of the last at the opposite sides of the ball portion of the shoe respectively, arms mounted for swinging movements widthwise of the shoe about axes extending heightwise of the shoe and having supported thereon portions of said wipers located farthest from the toe end of the shoe, other arms mounted for swinging movements about other axes extending heightwise of the shoe and having means for slidingly engaging and guiding portions of the wipers located nearest the toe end of the shoe, and means for thus swinging all said arms to impart to the wipers bodily inward movements with components of movement lengthwise of the shoe toward its toe end and for thereafter continuing the swinging movements of said other arms to swing the wipers relatively to the first-named arms about axes carried by the first-named arms.

78. In a lasting machine, wipers for wiping the marginal portion of the upper of a shoe on a last inwardly over the bottom of the last at the opposite sides of the ball portion of the shoe respectively, arms mounted for swinging movements widthwise of the shoe about axes extending heightwise of the shoe and having pivotally supported thereon portions of said wipers located farthest from the toe end of the shoe, other arms mounted for swinging movements about other axes extending heightwise of the shoe to control portions of the wipers located nearest the toe end of the shoe, means for thus swinging said other arms and for yieldingly swinging the first-named arms by the movements of said other arms to carry the wipers bodily inward widthwise of the shoe with components of movement lengthwise of the shoe toward its toe end, and means for stopping the swinging movements of the first-named arms prior to the completion of the movements of said other arms to cause the wipers to 79. In a lasting machine, wipers for wiping the marginal portion of the upper of a shoe on a last inwardly over the bottom of the last at the opposite sides of the ball portion of the shoe respectively, means for moving said wipers bodily inward widthwise of the shoe with components of movement lengthwise of the shoe toward its toe end to begin the wiping operation on the upper and for swinging them about axes located substantially at portions thereof which are farthest from the toe end of the shoe to complete the wiping operation, and supplemental wipers arranged to partake of the bodily movements of the first-named wipers widthwise and lengthwise of the shoe and thereby to be forced inwardly between the shoe and the portions of the first-named wipers where said axes are located.

80. In a lasting machine, wipers for wiping the marginal portion of the upper of a shoe on a last inwardly over the bottom of the last at the opposite sides of the ball portion of the shoe respectively, means for moving said wipers bodily inward widthwise of the shoe with components of movement lengthwise of the shoe toward its toe end and for thereafter swinging them about axes located substantially at portions thereof which are farthest from the toe end of the shoe in the wiping operation, supplemental wedge-shaped wipers arranged to partake of the bodily movements of the first-named wipers widthwise and lengthwise of the shoe and thereby to be forced inwardly between the shoe and the portions of the first-named wipers where said axes are located, and means for yieldingly controlling said supplemental wipers to permit continued movements of the first-named wipers if the movements of the supplemental wipers are stopped by resistance of the shoe.

81. In a lasting machine, wipers for wiping the marginal portion of the upper of a shoe on a last inwardly over the bottom of the last at the opposite sides of the ball portion of the shoe respectively, arms mounted for swinging movements widthwise of the shoe about axes extending heightwise of the shoe and having supported thereon portions of said wipers located farthest from the toe end of the shoe, other arms mounted for swinging movements about axes extending heightwise of the shoe to control the portions of the wipers located nearest the toe end of the shoe, means for thus swinging all said arms to impart to the wipers bodily inward movements with components of movement lengthwise of the shoe toward its toe end and for thereafter continuing the swinging movements of said other arms to swing the wipers relatively to the first-named arms about axes located substantially at the portions thereof which are farthest from the toe end of the shoe, and supplemental wipers carried by said first-named arms and arranged to be forced inwardly thereby between the shoe and the portions of the first-named wipers located farthest from the toe end of the shoe.

82. In a lasting machine, wipers for wiping the marginal portion of the upper of a shoe on a last inwardly over the bottom of the last at the opposite sides of the ball portion of the shoe respectively, arms mounted for swinging movements widthwise of the shoe about axes extending heightwise of the shoe and having supported thereon portions of said wipers located farthest from the toe end of the shoe, other arms mounted for swinging movements about other axes extending heightwise of the shoe to control the portions of the wipers located nearest the toe end of the shoe, means for thus swinging all said arms to impart to the wipers bodily inward movements with components of movement lengthwise of the shoe toward its toe end and for thereafter continuing the swinging movements of said other arms to swing the wipers relatively to the first-named arms about axes located substantially at the portions thereof which are farthest from the toe end of the shoe, supplemental wedge-shaped wipers carried by said first-named arms and arranged to be forced inwardly thereby widthwise and lengthwise of the shoe between the shoe and the portions of the wipers located farthest from the toe end of the shoe, and means for yieldingly controlling said supplemental wipers to permit continued movements of the first-named arms if the movements of the supplemental wipers are stopped by resistance of the shoe.

83. In a lasting machine, wipers for wiping the marginal portion of the upper of a shoe on a last inwardly over an insole on the last at the opposite sides of the ball portion of the shoe respectively, shoe rest members arranged to engage the bottom of the shoe respectively in different locations lengthwise of the shoe to determine the position of the shoe heightwise in the wiping operation, means for holding said members initially against movement in response to pressure of the shoe thereon, pressure-applying means for engaging the shoe on the top of the forepart to clamp the shoe against said members, means for releasing said members when the wipers have substantially completed their wiping movements to cause the shoe to be forced more firmly against the wipers by said pressure-applying means, and means for restricting one of said members when thus released to a shorter movement in response to the pressure of the shoe thereon than the other member to cause the shoe to be rocked by said pressure-applying means in the direction to increase the pressure of the wipers on the portions of the margin of the upper near the beginning of the shank portion of the shoe.

84. In a lasting machine, wipers for wiping the marginal portion of the upper of a shoe on a last inwardly over an insole on the last at the opposite sides of the ball portion of the shoe respectively, shoe-positioning means for engaging the bottom of the shoe to determine the position of the shoe heightwise relatively to the wipers in the wiping operation, said shoe-positioning means comprising a shoe rest member arranged to engage the ball portion of the shoe and another shoe rest member arranged to engage the toe-end portion of the shoe, means for holding said members initially against movement in response to pressure of the shoe thereon, pressure-applying means for engaging the shoe on the top of the forepart to clamp the shoe against said members, means for releasing said members when the wipers have substantially completed their wiping movements to cause the shoe to be forced more firmly against the wipers by said pressure-applying means, and means for restricting the member engaging the toe end of the shoe when thus released to a shorter movement in response to the pressure of the shoe thereon than the member engaging the ball portion of the shoe to cause the shoe to be rocked by said pressure-applying means in the direction to increase the pressure of the wipers on the portions of the margin of the upper near the beginning of the shank portion of the shoe.

85. In a lasting machine, wipers for wiping the marginal portion of the upper of a shoe on a last inwardly over an insole on the last at the opposite sides of the ball portion of the shoe respectively, a shoe rest member arranged to engage the bottom of the ball portion of the shoe, a lever supporting said shoe rest member and mounted to swing heightwise of the shoe, another shoe rest member arranged to engage the bottom of the toe-end portion of the shoe, another lever supporting said other shoe rest member and also mounted to swing heightwise of the shoe, a latch for initially holding said first-named lever against movement in response to pressure of the shoe on the shoe rest member supported thereby, the first-named lever being arranged to hold the other lever against corresponding movement in response to pressure of the shoe on said other shoe rest member, pressure-applying means for engaging the shoe on the top of the forepart to clamp the shoe against said members, means for operating said latch to release both the levers when the wipers have substantially completed their wiping movements to cause the shoe to be forced more firmly against the wipers by said pressure-applying means, and means for restricting said other lever when thus released to a shorter movement in response to the pressure of the shoe on the shoe rest member supported thereby than the lever supporting the shoe rest member engaging the ball portion of the shoe.

86. In a power-operated shoe machine, power-operated means for operating on a shoe in a cycle of operations of the machine, a clutch arranged to be actuated to start the machine, a member movable by the operator thus to actuate said clutch, a device for preventing such movement of said member and for thereby preventing actuation of the clutch by said member when the machine is idle, and means operated by fluid pressure for rendering said device inoperative thus to prevent actuation of the clutch in response to presentation of the shoe to the machine.

87. In a fluid-operated shoe machine, fluid-operated means for operating on a shoe, a treadle for controlling the operation of the machine, a device for preventing depression of said treadle when the machine is idle, means for developing fluid pressure prior to the operation of the machine on each shoe, and means for causing said device to release the treadle in response to such development of fluid pressure.

88. In a fluid-operated shoe machine, fluid-operated means for operating on a shoe, a treadle for controlling the operation of the machine, a device for preventing depression of said treadle when the machine is idle, a pump for normally circulating operating fluid without the development of any substantial fluid pressure, a valve for interrupting such circulation of fluid to cause the development of fluid pressure prior to the operation of the machine on each shoe, and means responsive to such development of fluid pressure for operating said device to release the treadle.

89. In a fluid-operated shoe machine, fluid-operated means for operating on a shoe in a cycle of operations of the machine, a clutch arranged to be actuated to start the machine, a member movable by the operator thus to actuate said clutch, a device for preventing actuation of the clutch by said member when the machine is idle, means for developing fluid pressure prior to the operation of the machine on each shoe, and means for rendering said device inoperative thus to prevent actuation of the clutch in response to such development of fluid pressure.

90. In a fluid-operated shoe machine, fluid-operated means for operating on a shoe in a cycle of operations of the machine, a treadle for starting the cycle of operations, a device for preventing depression of said treadle when the machine is idle, a pump for normally circulating operating fluid without the development of any substantial fluid pressure, a valve controlled by the shoe for interrupting such circulation of fluid to cause the development of fluid pressure in response to presentation of the shoe to the machine, and means for operating said device to release the treadle in response to such development of fluid pressure.

BERNHARDT JORGENSEN.

REFERENCES CITED

The following references are of record in the file of this patent:

UNITED STATES PATENTS

| Number | Name | Date |
|---|---|---|
| 131,251 | Corson | Sept. 10, 1872 |
| 389,275 | Woodward | Sept. 11, 1888 |
| 469,426 | Rouse | Feb. 23, 1892 |
| 524,444 | Lombard | Aug. 14, 1894 |
| 524,447 | Lombard | Aug. 14, 1894 |
| 1,018,477 | Brock | Feb. 27, 1912 |
| 1,129,047 | Simmons | Feb. 16, 1915 |
| 1,260,034 | Perri | Mar. 19, 1918 |
| 1,330,900 | Pope | Feb. 17, 1920 |
| 1,475,972 | Stiggins | Dec. 4, 1923 |
| 1,721,736 | Jorgensen | July 23, 1929 |
| 1,979,479 | Leland | Nov. 6, 1934 |
| 2,017,865 | Morgan | Oct. 22, 1935 |
| 2,071,396 | Engel | Feb. 23, 1937 |
| 2,315,548 | Schoenky | Apr. 6, 1943 |
| 2,371,358 | Sekella | Mar. 13, 1945 |
| 2,406,463 | Jorgensen | Aug. 27, 1946 |
| 2,423,454 | Jorgensen | July 8, 1947 |

FOREIGN PATENTS

| Number | Country | Date |
|---|---|---|
| 17,848 | Great Britain | of 1887 |